United States Patent
Vitic et al.

(10) Patent No.: US 12,158,639 B2
(45) Date of Patent: Dec. 3, 2024

(54) APPARATUS AND METHOD FOR DRIVING AN OPTICAL MODULATOR WITH INDEPENDENT MODULATOR ARM BIAS

(71) Applicant: Ciena Corporation, Hanover, MD (US)

(72) Inventors: Michael Vitic, Chelsea (CA); Christopher Edgar Falt, Nepean (CA)

(73) Assignee: Ciena Corporation, Hanover, MD (US)

( * ) Notice: Subject to any disclaimer, the term of this patent is extended or adjusted under 35 U.S.C. 154(b) by 501 days.

(21) Appl. No.: 17/679,532

(22) Filed: Feb. 24, 2022

(65) Prior Publication Data

US 2022/0179246 A1 Jun. 9, 2022

Related U.S. Application Data

(63) Continuation-in-part of application No. 17/141,672, filed on Jan. 5, 2021, now Pat. No. 11,650,475, which is a continuation-in-part of application No. 16/111,423, filed on Aug. 24, 2018, now Pat. No. 10,908,474.

(51) Int. Cl.
*G02F 1/025* (2006.01)
*G02F 1/01* (2006.01)
*G02F 1/21* (2006.01)
*G02F 1/225* (2006.01)

(52) U.S. Cl.
CPC ............ *G02F 1/025* (2013.01); *G02F 1/0123* (2013.01); *G02F 1/212* (2021.01); *G02F 1/2257* (2013.01)

(58) Field of Classification Search
CPC ........ G02F 1/025; G02F 1/212; G02F 1/0123; G02F 1/2257
See application file for complete search history.

(56) References Cited

U.S. PATENT DOCUMENTS

| | | |
|---|---|---|
| 9,841,618 B1 | 12/2017 | Poulin et al. |
| 2005/0254743 A1 | 11/2005 | Akiyama et al. |
| 2011/0074487 A1 | 3/2011 | Behnia |
| 2018/0356654 A1* | 12/2018 | Tatsumi .......... H03K 19/01812 |
| 2020/0064707 A1 | 2/2020 | Vitic et al. |

OTHER PUBLICATIONS

A. Zandieh, et al., "57.5GHz bandwidth 4.8Vpp swing linear modulator driver for 64GBaud m-PAM systems," 2017 IEEE MTT-S International Microwave Symposium (IMS), Honololu, HI, 2017, pp. 130-133.

* cited by examiner

*Primary Examiner* — Sung H Pak
*Assistant Examiner* — Hoang Q Tran
(74) *Attorney, Agent, or Firm* — Young Basile Hanlon & MacFarlane, P.C.

(57) ABSTRACT

Driving an optical modulator is described. A control circuit generates first and second target voltages based on a target phase modulation between first and second optical waveguide arms of the optical modulator. An offset control circuit generates first and second offset signals. A linear modulator driver receives the first and second target voltages and the first and second offset signals, and generates a first output voltage for biasing the first optical waveguide arm and a second output voltage for biasing the second optical waveguide arm. Feedback circuitry can feed the first and second output voltages to the offset control circuit, which can generate the first and second offset signals using the first and second output voltages. The output voltages bias the waveguide arms so the optical modulator operates close to the target phase modulation, even in the presence of manufacturing errors.

18 Claims, 19 Drawing Sheets

FIG. 21

APPARATUS AND METHOD FOR DRIVING AN OPTICAL MODULATOR WITH INDEPENDENT MODULATOR ARM BIAS

CROSS-REFERENCE TO RELATED APPLICATION

This application is a continuation-in-part of U.S. patent application Ser. No. 17/141,672, filed Jan. 5, 2021, which is a continuation-in-part of U.S. patent application Ser. No. 16/111,423, filed Aug. 24, 2018, each of which is incorporated herein in its entirety by reference.

TECHNICAL FIELD

This disclosure relates in general to driving an optical modulator, such as a Mach-Zehnder modulator, and more particularly to driving an optical modulator with independent modulator arm bias that, among other benefits, mitigates modulator fabrication errors.

BACKGROUND

In silicon, phase modulation is based on a dependency of a refractive index on free carrier density. Accordingly, by building a pn junction within an optical waveguide, and by applying a time-varying reverse voltage to the pn junction, the depletion region of the junction can be modulated. This modulates the free carrier density, hence modulating the refractive index.

In a series push-pull (SPP) configuration of an optical modulator, two pn junctions, each located in each of a pair of optical waveguides are connected back-to-back, with either the n-sides or the p-sides in electrical contact. This configuration is preferred for a low-chirp operation because it provides that, in an ideal case, each of the interferometer arms produces an equal but opposite amount of phase shift. In this ideal case, the $V\pi$ of each arm (i.e., the amount of voltage required to produce a phase change of $\pi$) is the same.

FIG. 1 illustrates an optical (e.g., a Mach-Zehnder) modulator 100 in the SPP configuration where the diodes 102 each comprise a p-doped region 104 and an n-doped region 106 forming a pn junction and are connected by their p-doped regions 104 in a nppn configuration between respective electrodes 107. For high-bandwidth operation, the pn junctions are generally used in depletion mode by applying a reverse (or negative) bias voltage Vb 108 to the point 110 connecting the diodes 102 back-to-back in series. One important requirement of the modulator 100 is that the modulator arms 112 and 114 provide very similar phase modulation efficiency. Arm dissimilarity causes imbalance of the phase modulation, which in turn creates a phase variation of the optical carrier (e.g., chirp) at the output 116 of the modulator 100.

Arm dissimilarity can be illustrated with reference to FIG. 2. Dopants of p and n types are implanted at locations defined by lithographic masks aligned over already-defined optical waveguides 202. This alignment, performed using stepper lithography or the like, has an accuracy of about 50 nm, while the optical waveguides 202 have a width of about 400 to 500 nm. As compared to the width of the waveguides 202, an alignment error is not negligible and may therefore cause a significant variation in modulation efficiency from device to device, even on the same wafer.

The top of FIG. 2 shows a pair of back-to-back pn junctions 204 of a SPP configuration of an optical modulator in a nppn configuration, such as the optical modulator 100, where the lithographic masks are well aligned during manufacture. In this example, each pn junction 204 (e.g., between a respective p-doped region 104 and n-doped region 106 of a diode 102) is located coincident with the center of each optical waveguide 202 of a modulator arm, such as modulator arms 112 and 114. In each modulator arm, the modulation of the depletion width of the pn junction 204 affects a portion of the optical mode overlapping with the pn junction 204, which will be, in this case, the same for each optical waveguide 202.

In contrast, the bottom of FIG. 2 shows the pair of back-to-back pn junctions 204 of a SPP configuration of an optical modulator in the nppn configuration, such as the optical modulator 100, when the lithographic masks are misaligned during manufacture with respect to their ideal or correct position (i.e., the position defined by design). For simplicity, the same misalignment error or offset M for the n and p masks has been illustrated such that the interface of the pn junctions 204 are collectively shifted. This offset M of the pn junctions 204 leads to the optical mode in each optical waveguide 202 interacting with a larger portion of p-doped material on the waveguide 202 at the modulator arm 112 (e.g., the p-doped region 104 is larger) and with a larger portion of n-doped material on the waveguide 202 at the modulator arm 114 (e.g., the n-doped region 106 is larger). As the index variation associated with the modulation of the p and n-doped material is different, the modulation efficiency for the two modulator arms 112 and 114 will also differ, causing modulation imbalance. Stated differently, misalignment of lithographic masks employed to wafer level manufacture of the p and n-doped regions 104 and 106 with regards to the optical waveguides 202 can induce an imbalance in the modulation efficiency of the arms 112 and 114 of the optical modulator 100. The resulting chirp in the output 116 is an undesirable result of the imbalance.

SUMMARY

Independent modulator arm bias, when applied to an optical modulator, can mitigate fabrication errors and the like that can otherwise reduce the quality and efficiency of the operation of the optical modulator.

In an implementation of an apparatus described herein, the apparatus can include an optical modulator control circuit configured to generate a first input voltage and a second input voltage, the first input voltage and the second input voltage determined to produce a target phase modulation between a first optical waveguide arm and a second optical waveguide arm of an optical modulator, an offset control circuit configured to generate a first offset signal and a second offset signal based on the first input voltage and the second input voltage, and a linear modulator driver. The linear modulator driver is configured to receive the first offset signal and the second offset signal, generate, using the first offset signal, a first output voltage for biasing the first optical waveguide arm, and generate, using the second offset signal, a second output voltage for biasing the second optical waveguide arm, wherein at least one of the first output voltage is different from the first input voltage or the second output voltage is different from the second input voltage.

In another implementation of an apparatus described herein, the apparatus can include an optical modulator control circuit configured to generate a first input voltage and a second input voltage, the first input voltage and the second input voltage determined to produce a target phase modulation between a first optical waveguide arm and a second optical waveguide arm of an optical modulator, an offset control circuit configured to generate a first offset current and a second offset current, and a linear modulator driver. The linear modulator driver is configured to receive the first input voltage, the second input voltage, the first offset current, and the second offset current, and to generate a first output voltage for biasing the first optical waveguide arm by modifying the first input voltage using the first offset current and to generate a second output voltage for biasing the second optical waveguide arm by modifying the second input voltage using the second offset current, wherein at least one of the first output voltage is different from the first input voltage or the second output voltage is different from the second input voltage.

An implementation of a method described herein, includes receiving, from an optical modulator control circuit, a first input voltage and a second input voltage, wherein the first input voltage and the second input voltage are determined to produce a target phase modulation between a first optical waveguide arm and a second optical waveguide arm of an optical modulator, generating, using an offset control circuit, a first offset signal and a second offset signal based on the first input voltage and the second input voltage, receiving, at a linear modulator driver, the first offset signal and the second offset signal, and generating, using the linear modulator driver, a first output voltage for biasing the first optical waveguide arm using the first offset signal, and a second output voltage for biasing the second optical waveguide arm using the second offset signal, wherein at least one of the first output voltage is different from the first input voltage and the second output voltage is different from the second input voltage.

In another implementation of an apparatus described herein, the apparatus can include an optical modulator, a linear modulator driver coupled to the optical modulator, and an offset control circuit coupled to the linear modulator driver. The optical modulator is configured to produce a target phase modulation between a first optical waveguide arm and a second optical waveguide arm of an optical modulator. The linear modulator driver comprises an emitter follower differential stage that includes a first transistor and a second transistor, wherein an emitter of the first transistor is coupled to the first optical waveguide arm of the optical modulator and an emitter of the second transistor is coupled to the second optical waveguide arm of the optical modulator. The offset control circuit is configured to set the first transistor in a first operating state for providing a first operating bias to the first optical waveguide arm of the optical modulator and the second transistor in a second operating state for providing a second operating bias to the second optical waveguide arm of the optical modulator, whereby the first optical waveguide arm exhibits a first modulation characteristic and the second optical waveguide arm exhibits a second modulation characteristic that is different than the first modulation characteristic.

An implementation of a method described herein, includes receiving, by a linear modulator driver, from an offset control circuit, a first offset control signal and a second offset control signal, the linear modulator driver comprising an emitter follower differential stage that includes a first transistor and a second transistor; producing at an emitter of the first transistor, based on the first offset control signal, a first operating bias for biasing a first optical waveguide arm of an optical modulator, whereby the first optical waveguide arm exhibits a first modulation characteristic; and producing at an emitter of the second transistor, based on the second offset control signal, a second operating bias for biasing a second optical waveguide arm of the optical modulator, whereby the second optical waveguide arm exhibits a second modulation characteristic that is different than the first modulation characteristic.

In another implementation of an apparatus described herein, the apparatus can include an optical modulator control circuit, an offset control circuit, and a linear modulator driver. The optical modulator control circuit is configured to generate a first target voltage and a second target voltage. The offset control circuit is configured to generate a first offset signal and a second offset signal. The linear modulator driver is configured to receive the first target voltage and the second target voltage; receive the first offset signal and the second offset signal; generate, using the first offset signal and the first target voltage, a first output voltage for biasing a first optical waveguide arm of an optical modulator; and generate, using the second offset signal and the second target voltage, a second output voltage for biasing a second optical waveguide arm of the optical modulator, wherein at least one of the first output voltage is different from the first target voltage or the second output voltage is different from the second target voltage, and wherein the first output voltage and the second output voltage produce a desired phase modulation between the first optical waveguide arm and the second optical waveguide arm of the optical modulator.

An implementation of another method described herein, includes receiving, from an optical modulator control circuit, a first target voltage and a second target voltage; generating, using an offset control circuit, a first offset signal and a second offset signal; receiving, at a linear modulator driver, the first target voltage, the second target voltage, the first offset signal, and the second offset signal; and generating, using the linear modulator driver, a first output voltage for biasing a first optical waveguide arm of an optical modulator, and a second output voltage for biasing the second optical waveguide arm of the optical modulator, wherein at least one of the first output voltage is different from the first target voltage and the second output voltage is different from the second target voltage The implementations herein may be used with various optical modulators, including, for example, in a Mach-Zehnder optical modulator having a series push-pull configuration, for example; in a Mach-Zehnder optical modulator made using silicon-on-insulator wafers (i.e., silicon photonics); and in InP, LiNbO3, polymer, and/or organic-hybrid modulators.

Details of these and other implementations of the teachings herein are described below with reference to the drawings.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

FIG. 21 is a schematic diagram illustrating an embodiment of a modulator device of the proposed solution using a nppn SPP configuration, driven by a single emitter follower push-pull differential driver.

DETAILED DESCRIPTION

Figure 2:
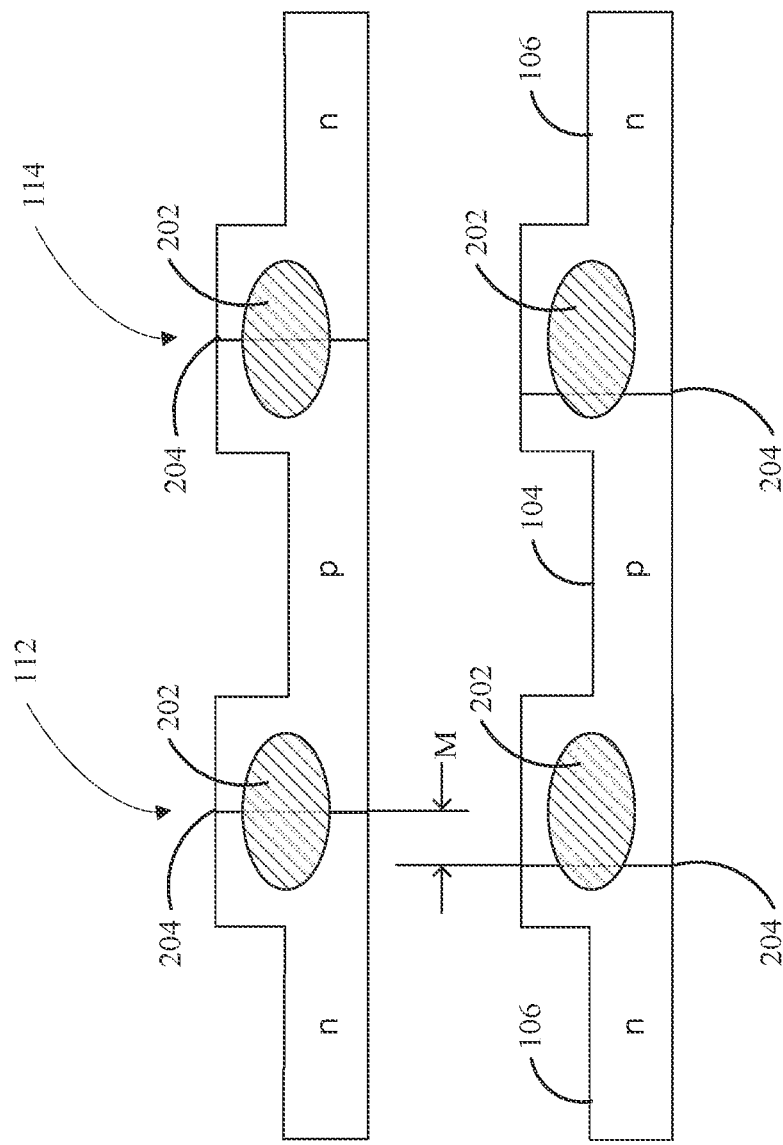
FIG. 2 is a schematic diagram illustrating the pn junctions of an SPP modulator configuration manufactured with correct and incorrect lithographic mask alignments.
Figure 3:
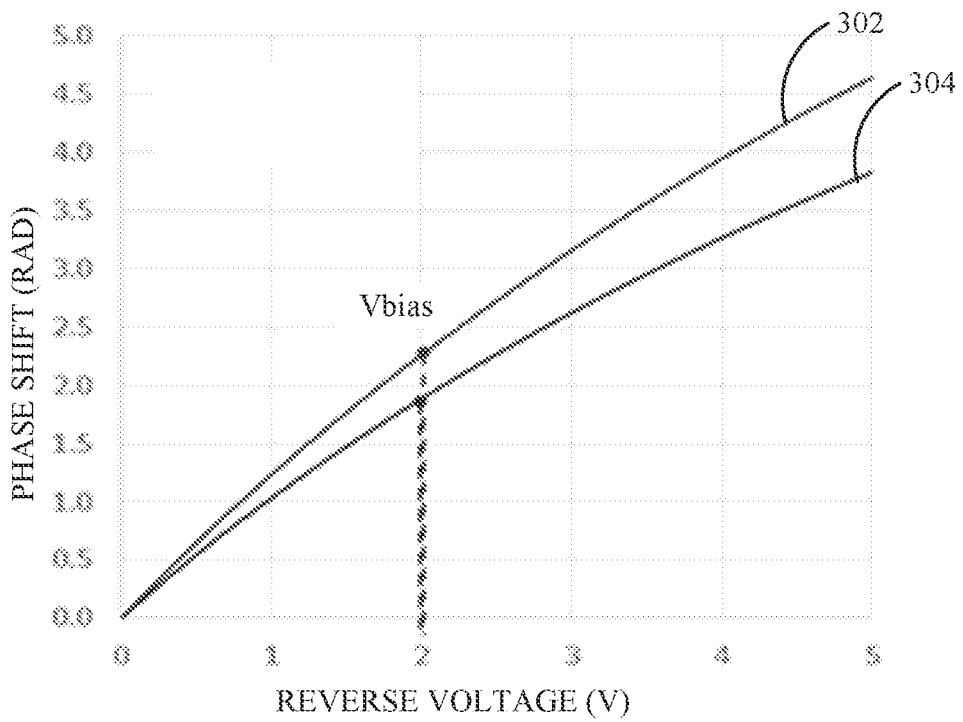
FIG. 3 is a graph that plots phase shift against applied voltage for each of the modulator arms of an optical modulator that could result from an imperfect fabrication.

As explained above with regards to FIG. 2, the pn junctions 204 of each of the modulator arms 112 and 114 have different amounts of p and n-doped material associated with the optical waveguides 202 when, for example, fabrication involves incorrect lithographic mask alignment(s) that defined the doped regions. FIG. 3 illustrates a voltage potential phase shift (in radians) obtained in each arm 112 and 114 of the optical modulator 100 in the case of such imperfect fabrication. Specifically, the curve 302 illustrates the phase shift in the modulator arm 112 resulting from different values of the applied reverse bias voltage Vbias, while the curve 304 illustrates the phase shift in the modulator arm 114 resulting from different values of the applied reverse bias voltage Vbias.

Although the phase shift difference at the applied reverse bias voltage (at 2V as shown) is not large, the different slopes at this operation point (i.e., the different efficiencies in terms of phase shift per unit voltage applied) are significant. Such an optical modulator 100 will induce chirp on the optical carrier and lead to incurring a penalty in the link budget.

Figure 1:
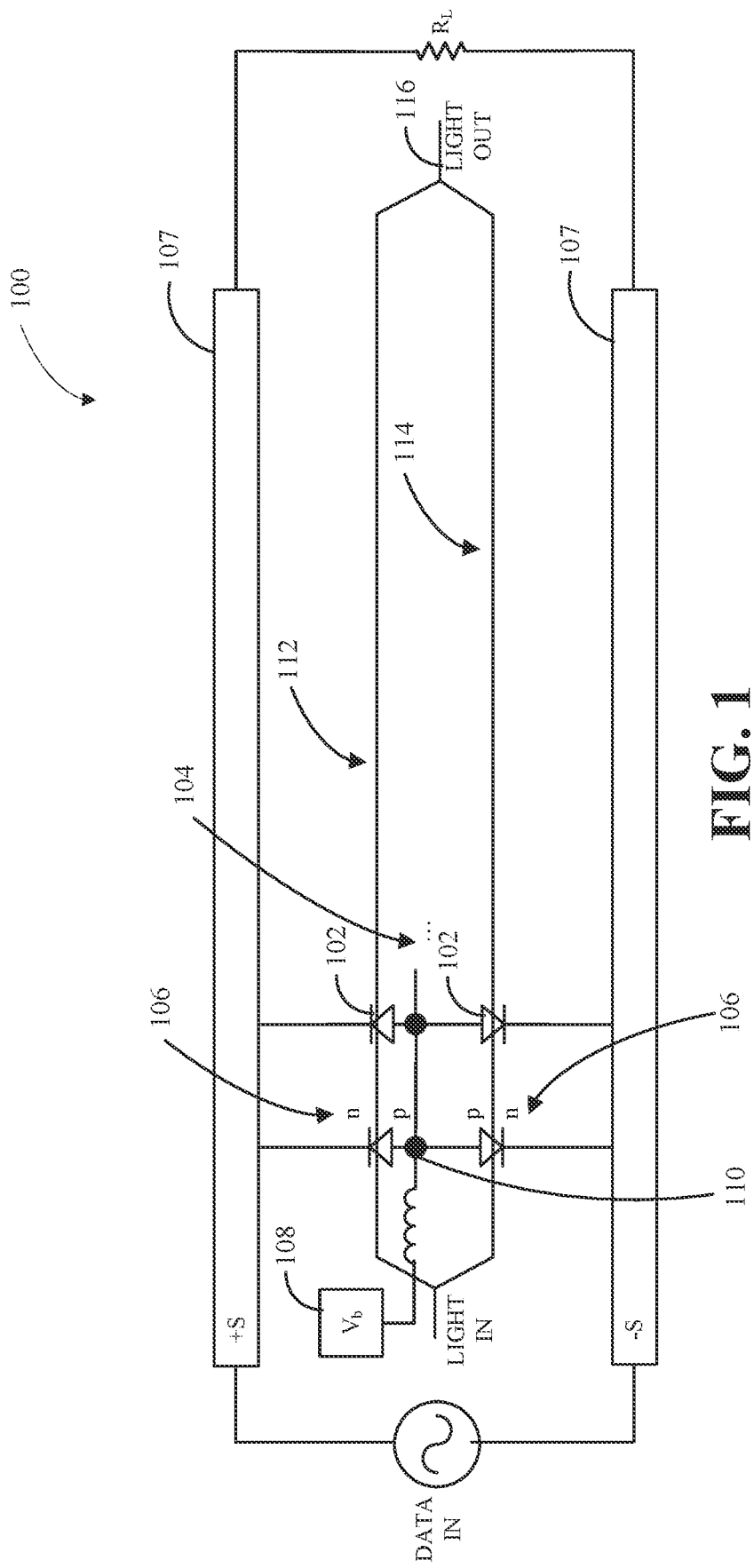
FIG. 1 is a schematic diagram illustrating an optical modulator in a nppn configuration.

A useful figure of merit for quantizing the effect of a mismatch in efficiency (i.e., a mismatch of $V_\pi$) between the arms 112 and 114 (FIG. 1) of the optical modulator 100 is the radio frequency (RF) imbalance α. In accordance with a small modulation signal approximation, the phase shifts induced in both arms 112 and 114 around the reverse bias voltage of operation Vbias can be expressed as a mean phase shift $\Delta\phi_m$ produced in the two arms 112 and 114, plus or minus a deviation $\Delta\phi$ from it:

$$\Delta\phi_1 = \Delta\phi_m + \Delta\phi = \Delta\phi_m(1+\alpha) \quad (1)$$

$$\Delta\phi_2 = \Delta\phi_m - \Delta\phi = \Delta\phi_m(1-\alpha) \quad (2)$$

The imbalance (or, more generally, the RF imbalance) α is then the relative deviation from this mean phase shift. In the preceding, all phase shifts are defined as:

$$\Delta\phi_1 = \frac{d\phi_1}{dV}\bigg|_{Vbias} \Delta V \quad (3)$$

where ΔV is the voltage difference with respect to the applied bias voltage.

The RF imbalance α can thus be expressed as a function of the slopes of the phase versus voltage characteristics using:

$$\alpha = \frac{\Delta\phi_1 - \Delta\phi_2}{2\Delta\phi_m} = \frac{\left.\frac{d\phi_1}{dV}\right|_{Vbias} - \left.\frac{d\phi_2}{dV}\right|_{Vbias}}{\left.\frac{d\phi_1}{dV}\right|_{Vbias} + \left.\frac{d\phi_2}{dV}\right|_{Vbias}} \quad (4)$$

For example, the RF imbalance at 2V reverse bias in the case of FIG. 3 is −0.096.

It is implicitly understood here that the efficiency of the two pn junctions 110 depends upon the frequency at which the voltage (+S, −S) is modulated. As such, differing modulation efficiencies between the two pn junctions 110 could result from them having differing capacitances, leading to a frequency-dependent imbalance, hence the term "RF" imbalance. Additional frequency dependency could result, for example, from the circuit configuration itself, which can lead to one pn junction being driven preferentially over the other at some frequencies, as can be the case of pn junctions 110 used in a SPP configuration and driven by a single-ended driver. For a modulation voltage varying in time, the paths followed on the curves illustrated in FIG. 3 will be different at each frequency of the modulating signal. Although the previous equations do not explicitly indicate the frequency dependency of α (i.e., α(f)), such dependency is understood to be implicitly addressed and covered by the present disclosure.

Figure 4:
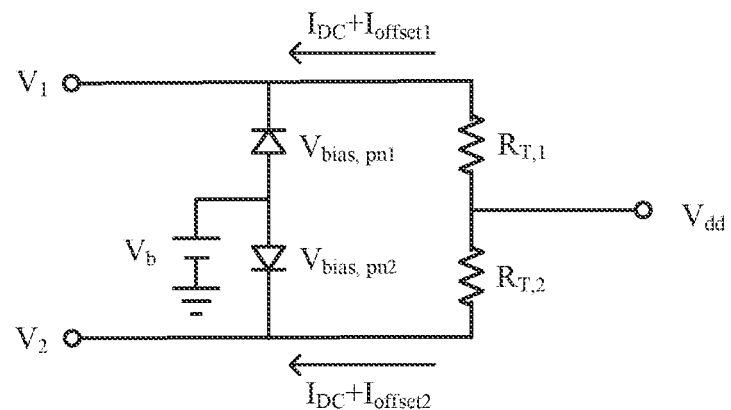
FIG. 4 is a circuit diagram illustrating driver output DC voltages applied to modulator electrodes, further connected to two pn junctions in series and to terminations.

Referring now to FIG. 4, with a direct current (DC)-coupled driver, some DC voltages are applied by the driver terminals to the modulator electrodes, such as the modulator electrodes 107. The DC voltages are illustrated by $V_1$ and $V_2$ in FIG. 4 (e.g., $V_1$ and $V_2$ can be the voltages at the collectors of a differential transistor pair). Also, optical modulators (such as MZ modulators) are often travelling-wave modulators that need to be terminated (illustrated as $R_{T,1}$ and $R_{T,2}$ in FIG. 4, which should ideally be of the same value, or as $R_L$ in FIG. 1). Finally, a frequent configuration is the open-collector configuration, which supplies the transistors' current through the termination, using some voltage, called $V_{dd}$ in FIG. 4. Other sources of imbalance between the two arms 112 and 114 of the optical modulator 100 can result from mismatched termination resistances (i.e., $R_{T,1} \neq R_{T,2}$) and mismatched transistors' β parameter (i.e., DC current gain) within the driver. Even if the manufacture does not introduce misalignment of the pn junctions 110 (FIG. 1), these additional sources can contribute, in part, to the RF imbalance α.

As a note, the DC (reverse) bias voltage applied to pn junction I is, according to FIG. 4:

$$V_{bias,i} = V_i - V_b = V_{dd} - R_{T,i}i_i - V_b \quad (5)$$

where $i_i$ is the DC current flowing through the termination resistor $R_{T,i}$.

Figure 5:
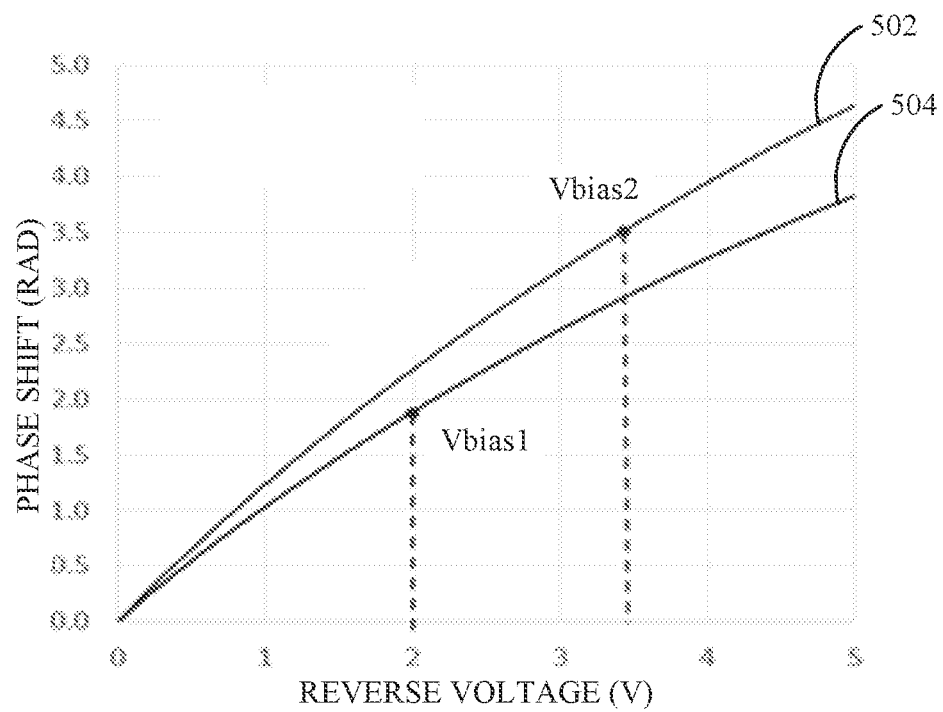
FIG. 5 is a graph that plots phase shift versus applied voltage for two arms of an optical modulator of the proposed solution, in the case of a manufacturing bias.
Figure 6:
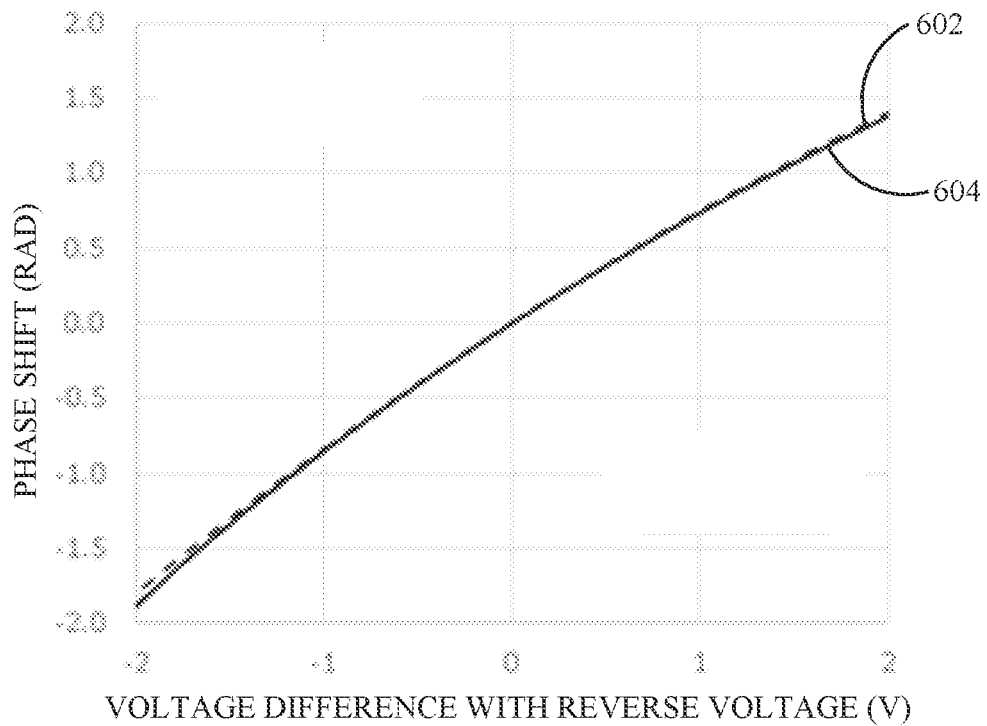
FIG. 6 is a graph that plots the phase shifts in first and second arms with the abscissa showing the offset voltage applied to either pn junction relative to its own reverse bias voltage.

In accordance with the teachings herein, the arms of the optical modulator 100 can be made to exhibit the same phase modulation efficiency regardless of any manufacturing error(s) by supplying a dissimilar reverse bias voltage to the two modulator arms 112 and 114. This is illustrated in FIG. 5, where separate bias voltages Vbias1 (2V) and Vbias2 (3.8V) are used for the first and second arms, respectively. At these operating points, the phase shift versus voltage slopes of curves 502, 504 are equal and, as such, the resulting RF imbalance is close to zero. FIG. 6 further illustrates this by removing the phase shift difference between the curves 502, 504 and by showing with the abscissa the modulation voltage applied to either pn junction relative to its own reverse bias voltage (i.e., Vbias,pn1 or Vbias,pn2). It can be seen that the two pn junctions then display very similar efficiencies (i.e., the same slope, or Vπ, for the adjusted curves 602, 604). Throughout the specification, references to "fabrication" or "manufacture" are understood as "wafer level manufacture."

According to FIG. 4, providing different bias voltages to the pn junctions can employ different voltages $V_1$ and $V_2$ at the driver output terminals. According to some implementations, this can be achieved through use of a current offset control circuit in the driver, as is described in greater detail herein below.

Figure 7:
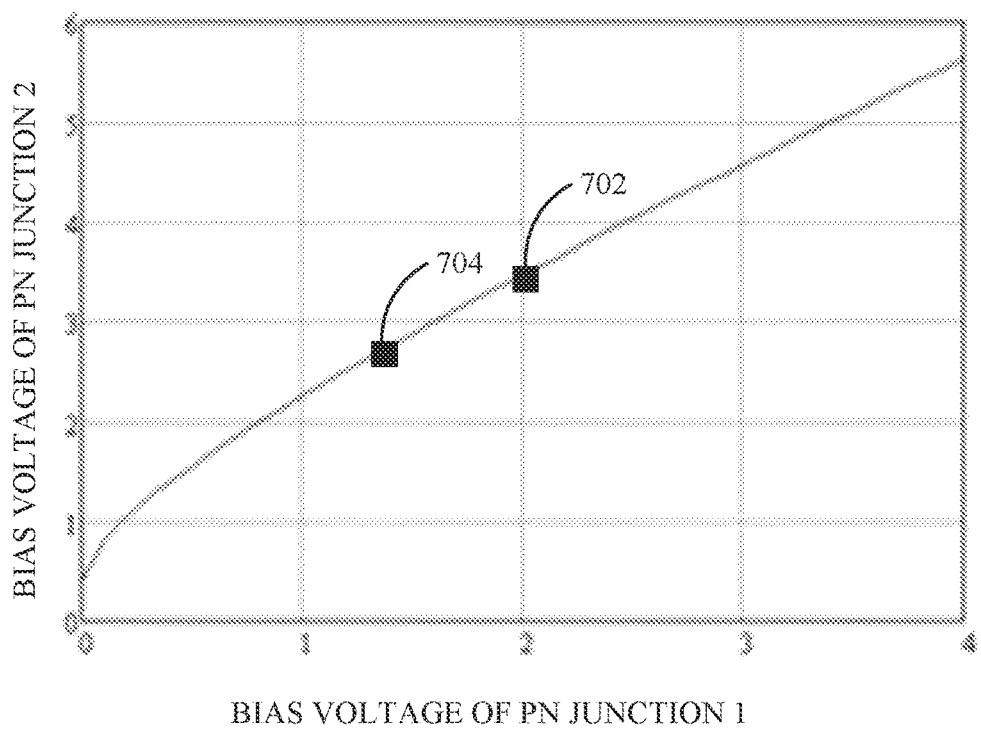
FIG. 7 is a graph that plots the bias voltage to use for pn junction 2 as a function of the bias voltage used for pn junction 1 enabling cancellation of the RF imbalance.
Figure 8:
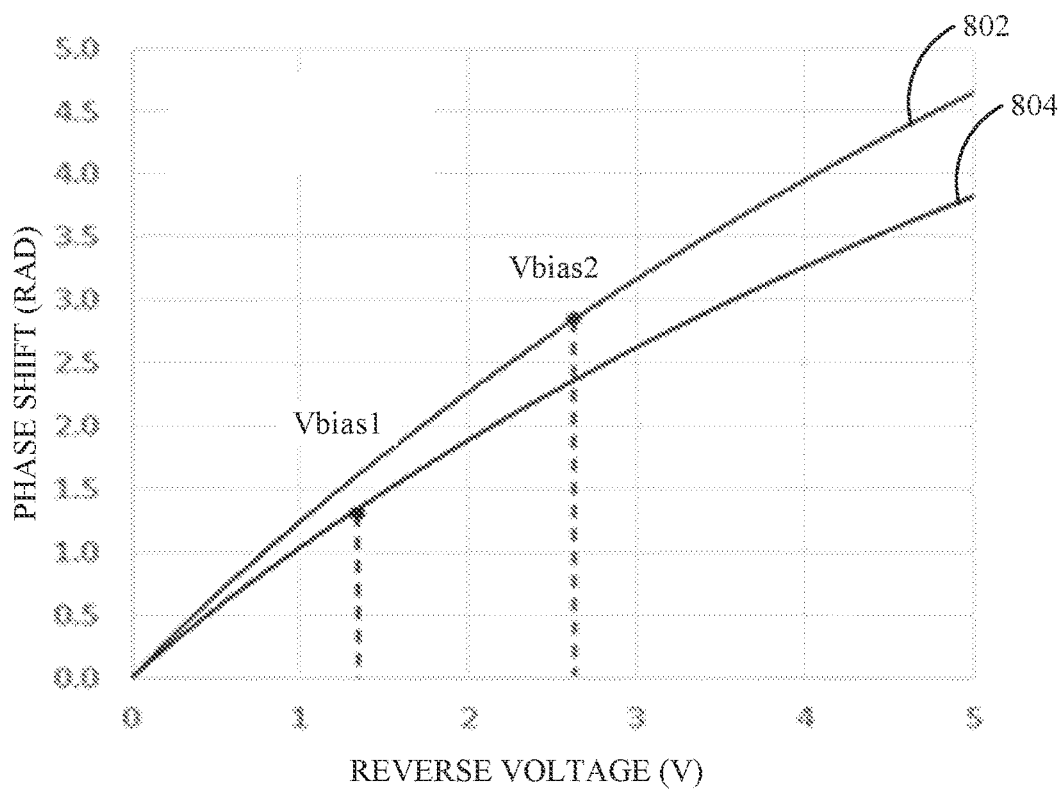
FIG. 8 is a graph that plots the symmetrical variation of the bias voltages around 2V providing cancellation of the RF imbalance.

Before describing examples of circuits that can be used to control the current offsets, one should observe that, in the previous example, one of the bias voltages was kept unchanged (at 2V) while the other was adjusted to cancel the RF imbalance. This is not necessarily the way electronic circuits operate. Rather, one of the bias voltages can be reduced, while the other can be increased, potentially by the same amount. considering the RF imbalance when the change in bias voltage for one pn junction is equal and opposite to that for the other pn junction. FIG. 7 shows sets of bias voltages for pn junction 1 (Vbias,pn1) and pn junction 2 (Vbias,pn2) that enable the cancellation of the RF imbalance. The point 702 illustrates the case used in FIG. 5. In contrast, at Vbias,pn1=1.33V and Vbias,pn2=2.67V (i.e., the point 704), the pn junction reverse bias voltages sit at equal distances on each side of the mean bias voltage of 2V, and the RF imbalance is cancelled. This configuration is illustrated in FIG. 8 relative to the curves 802, 804.

Figure 9:
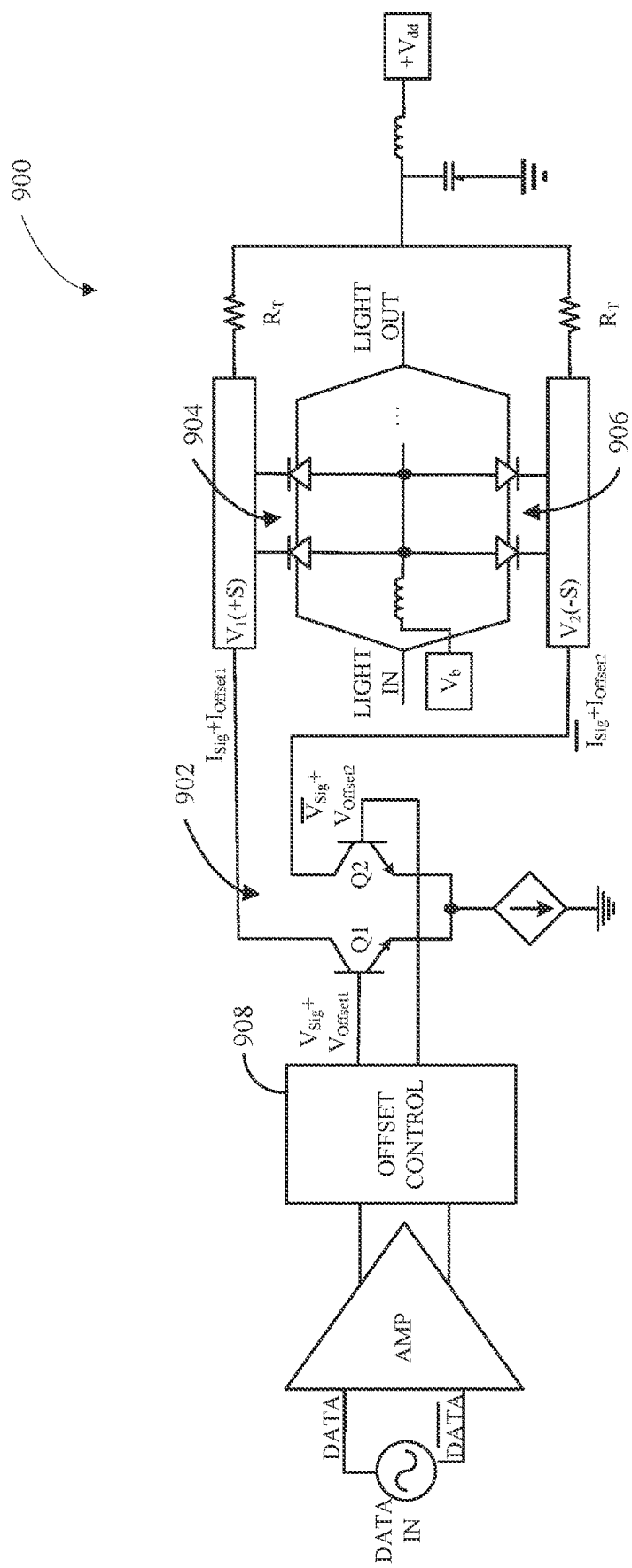
FIG. 9 is a schematic diagram illustrating an embodiment of a modulator device of the proposed solution using a nppn SPP configuration, driven with a dissimilar DC current from an open collector driver.

FIG. 9 illustrates a modulator device 900 of the proposed solution in the case of an open collector (i.e., a drain for MOS devices) driver (i.e., a current or transconductance driver) with a differential output 902, whereby each driver arm 904 and 906 provides a different DC current ($I_{Offset1}$ and $I_{Offset2}$). This results in a dissimilar voltage drop at the terminations $R_T$, resulting in a dissimilar reverse bias voltage for the two pn junctions forming the optical modulator. This configuration allows using a single bias voltage $V_b$ to polarize the pn junctions so that they operate in the depletion mode (i.e., reverse bias operation), but operate with different reverse bias voltages Vbias,pn1 and Vbias,pn2, as described above.

According to FIGS. 4 and 9, the change in the reverse bias voltage applied to pn junction i relates to the amount of current offset provided by the driver $I_{Offset,i}$, as follows:

$$\Delta V_{bias,i} = R_T I_{Offset,i} \quad (6)$$

In accordance with a practical example employing a mean driver DC current of 50 mA circulating in each resistor $R_T$, the amount of current variation could be limited to around ±20% of the driver current (i.e., ±10 mA). Across 25Ω resistors, this leads to a change in bias voltage of ±0.25V. Operating pn junction 1 at 1.75V and pn junction 2 at 2.25V leads to a RF imbalance α=−0.06, in the illustrative example presented earlier. Although this does not completely cancel the RF imbalance, it can be enough to make the optical modulator meet the applicable RF imbalance specification and/or make the overall system meet the applicable link budget. The use of such current offset capability within the driver can provide sufficient adjustment in the pn junction reverse bias to shift the statistical distribution of the modulator RF imbalance and increase the yield significantly.

Not only can this configuration compensate for optical modulator inefficiency, it can also compensate for manufacturing errors in the two termination resistors, $R_{T,1}$ and $R_{T,2}$, in FIG. 4. In an ideal scenario where the two modulator electrodes (such as electrodes 107) have no manufacturing errors and have identical efficiencies, the same DC voltages $V_1$ and $V_2$ (referring to FIG. 4) would be desirably applied to each electrode, where $V_1=V_2=V_{dd}-I_{DC}R_T$ (i.e., $I_{Offset}$ would be 0 in this case). However, due to manufacturing errors in the two resistors $R_T$ forming the termination, dissimilar voltage values for $V_1$ and $V_2$ could result, which would lead to unequal reverse bias voltages applied to the two pn junctions. In this case, the driver would be configured to apply different current offsets at the outputs of its two arms, such that the resultant voltage drops across $R_{T,1}$ and $R_{T,2}$ are similar; in other words, $I_{DC}R_{T,1}+I_{Offset1}R_{T,1}=I_{DC}R_{T,2}+I_{Offset2}R_{T,2}$.

This configuration can also correct for manufacturing errors in the drive"s output transistors Q1 and Q2, where the two transistors could not be made identical through manufacture, resulting in differing values for $I_{Offset1}$ and $I_{Offset2}$. This results from a transconductance mismatch $g_m$, a mismatch in the current gain β, or both. To compensate, dissimilar voltages $V_{Offset1}$ and $V_{Offset2}$ are applied to the base of the transistors Q1 and Q2, respectively. In FIG. 9, the offset control 908 includes electronics determining the applicable current offsets.

Figure 10:
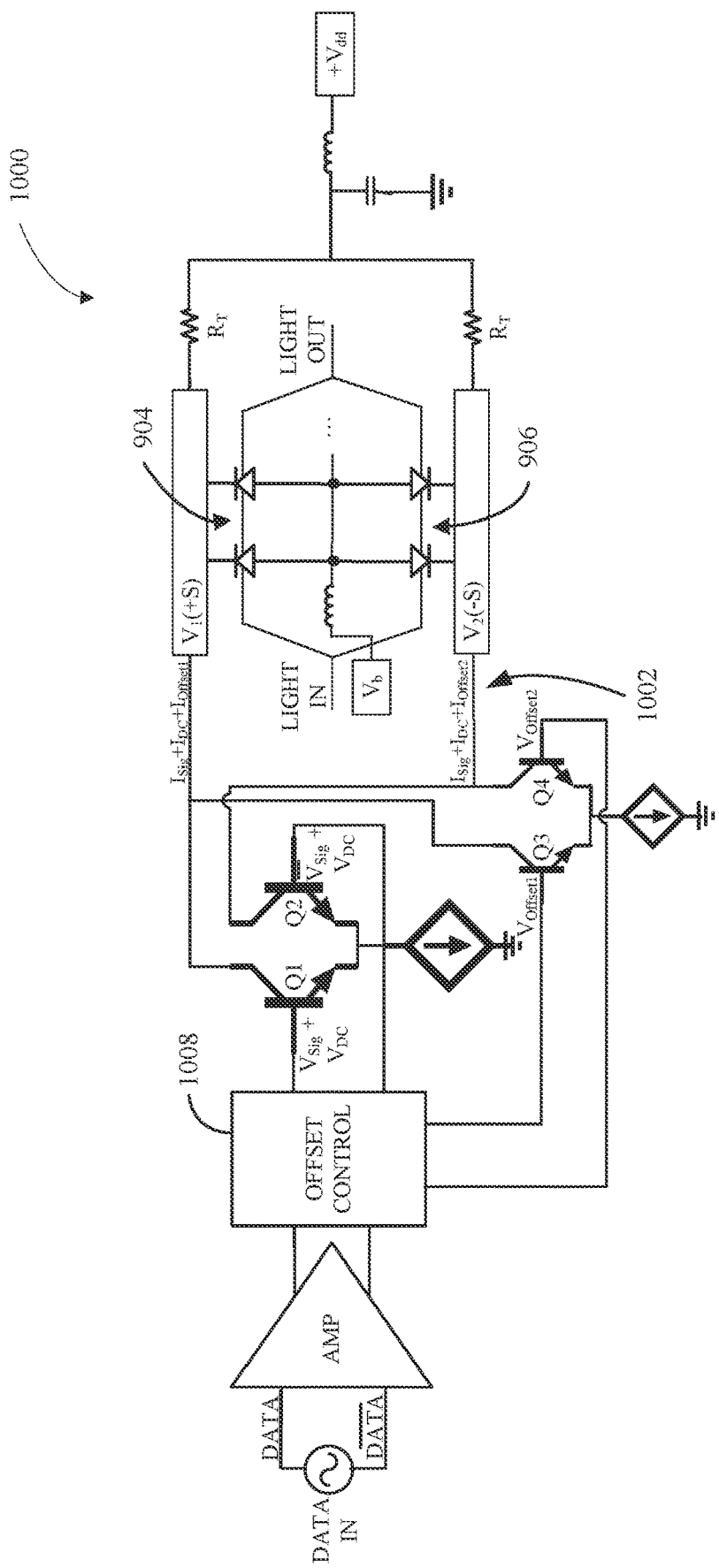
FIG. 10 is a schematic diagram illustrating another embodiment of a modulator device of the proposed solution using a nppn SPP configuration, driven with a dissimilar DC current from an open collector driver and with separate transistors providing offset currents.

FIG. 10 provides a variation of FIG. 9. That is, FIG. 10 illustrates a modulator device 1000 of the proposed solution in the case of an open collector driver where the offset is provided using two additional transistors Q3 and Q4. The transistors Q1 and Q2 provide the modulated complementary currents $I_{sig}$ and $\overline{I_{sig}}$ and DC current $I_{DC}$ responsive to differing voltages $V_{DC}V_{sig}$ and $V_{DC}+\overline{V_{sig}}$ applied to the base of the transistors Q1 and Q2, respectively. Transistors Q3 and Q4 add the offset correction current $I_{Offset1}$ and $I_{Offset2}$ to correct for manufacturing errors responsive to differing voltages $V_{Offset1}$ and $V_{Offset2}$ applied to the base of the transistors Q3 and Q4, respectively. This combination enables a differential output 1002 having larger correction range for the pn junction reverse bias voltage, enabling not only reduction of the RF imbalance, but sufficient cancellation, while reducing distortion. In FIG. 10, the offset control 1008 includes electronics determining the applicable voltage offsets.

Figure 11:
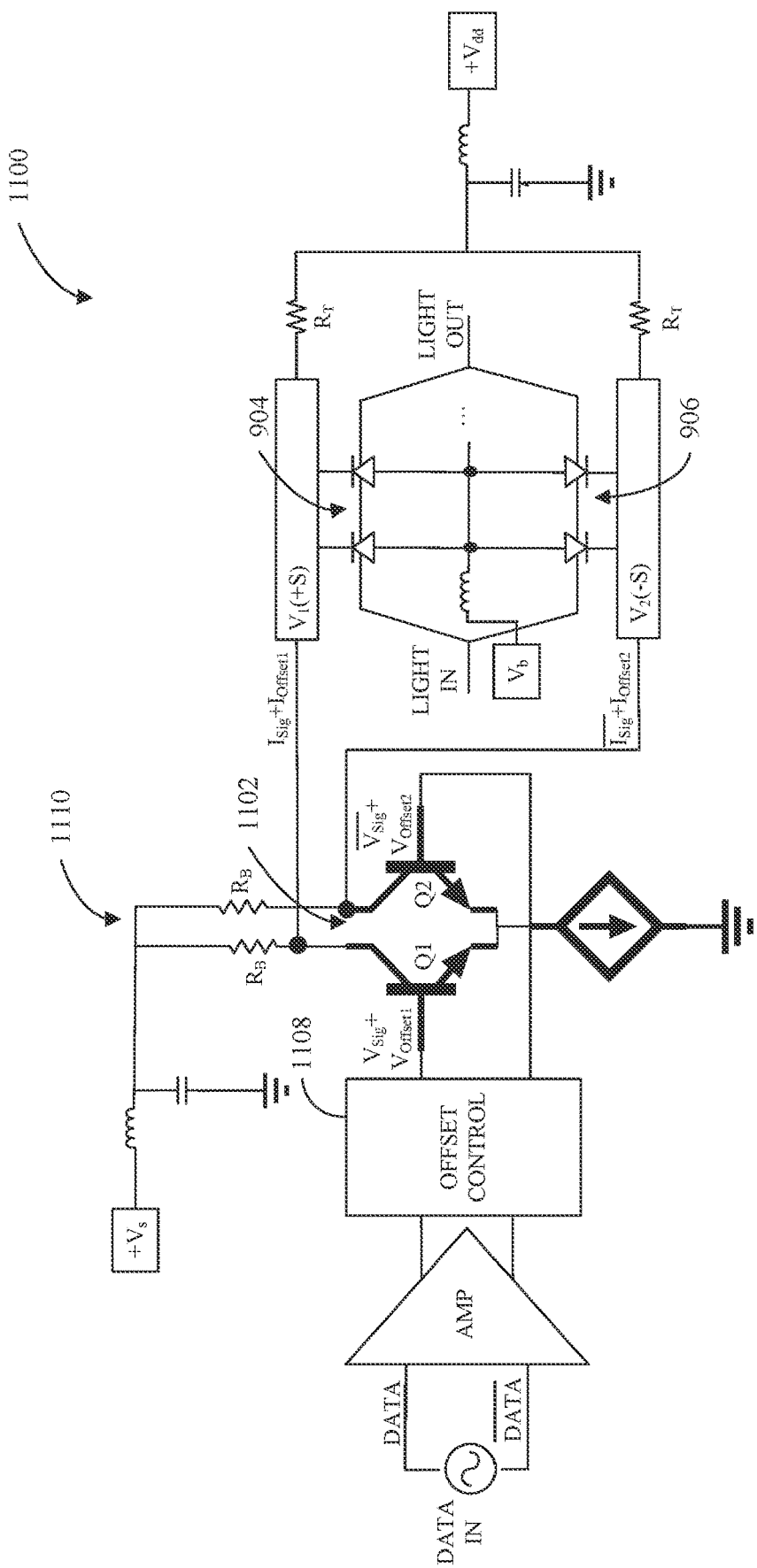
FIG. 11 is a schematic diagram illustrating a further embodiment of a modulator device of the proposed solution using a nppn SPP configuration, driven with a dissimilar DC current from a back-terminated differential driver.

FIG. 11 illustrates a modulator device 1100 of the proposed solution employing a back-terminated differential driver 1110 with a differential output 1102, whereby each driver arm 904 and 906 provides a different DC current ($I_{Offset1}$ and $I_{Offset2}$) responsive to differing voltages $V_{sig}+V_{Offset1}$ and $\overline{V_{sig}}+V_{Offset2}$ applied to the base of the transistors Q1 and Q2, respectively. Again, this results in a dissimilar voltage drop at the termination resistors $R_T$, resulting in dissimilar reverse bias voltages for the two pn junctions of the modulator device 1100. This configuration allows using a single bias voltage $V_b$ to bias the pn junctions so that they operate in the depletion mode (i.e., reverse bias operation), but operate with different individual reverse bias voltages Vbias,pn1 and Vbias,pn2, as described above. In FIG. 11, the offset control 1108 includes electronics determining the applicable voltage offsets.

Figure 12:
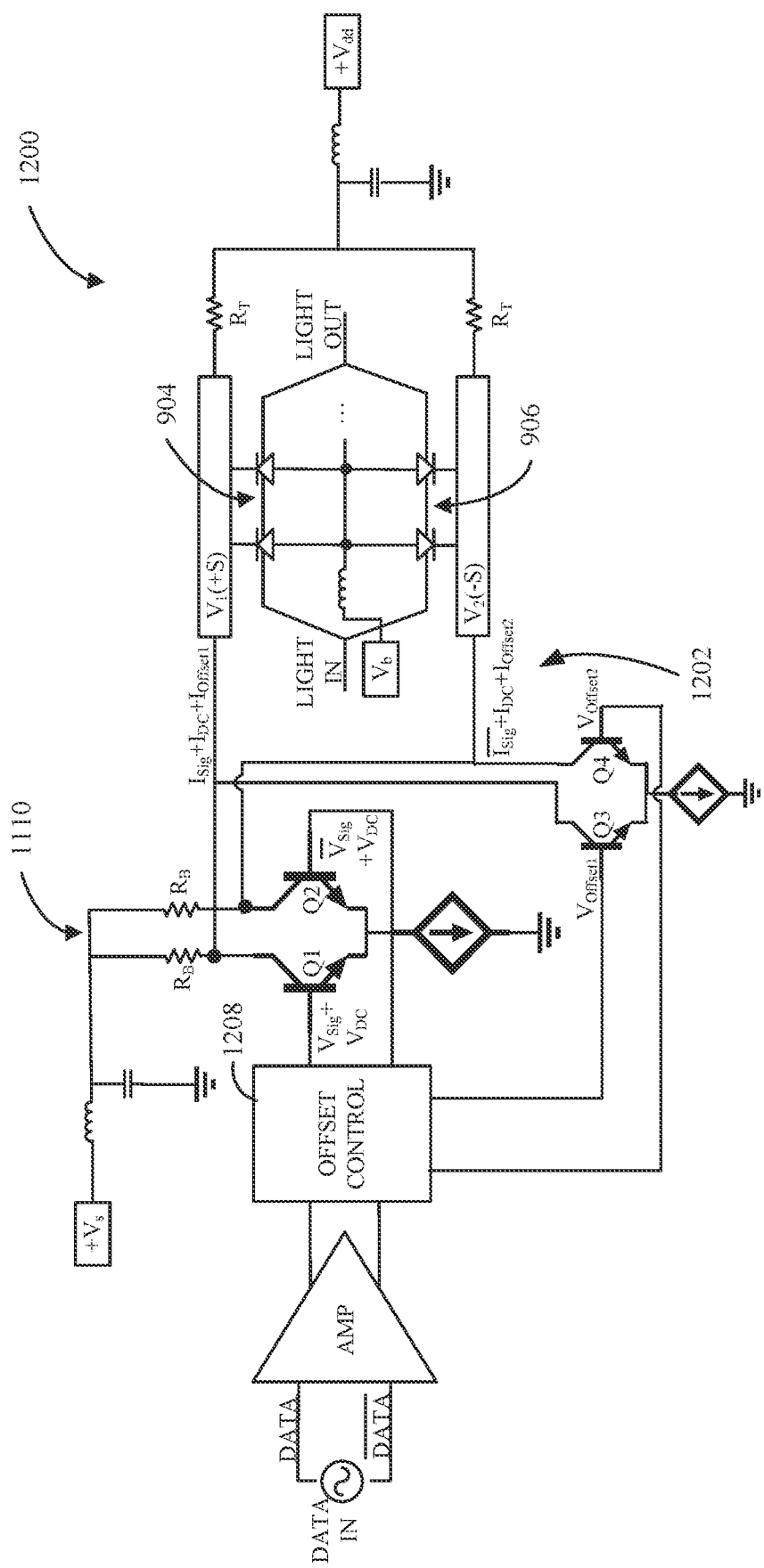
FIG. 12 is a schematic diagram illustrating a further embodiment of a modulator device of the proposed solution using a nppn SPP configuration, driven with a dissimilar DC current from a back-terminated differential driver and with separate transistors providing offset currents.

FIG. 12 provides a variation of FIG. 11, where the offset is provided using two additional transistors Q3 and Q4. That is, FIG. 12 is a modulator device 1200 of the proposed solution using a nppn SPP configuration driven with a dissimilar DC current from a back-terminated differential driver, which further includes separate transistors Q3 and Q4 providing offset currents. The transistors Q1 and Q2 provide the modulated complementary currents $I_{sig}$ and $\overline{I_{sig}}$ and DC current $I_{DC}$ responsive to differing voltages $V_{DC}+V_{sig}$ and $V_{DC}+\overline{V_{sig}}$ applied to the base of the transistors Q1 and Q2, respectively. Transistors Q3 and Q4 add the offset correction current $I_{Offset1}$ and $I_{Offset2}$ to correct for manufacturing errors responsive to differing voltages $V_{Offset1}$ and $V_{Offset2}$ applied to the base of the transistors Q3 and Q4, respectively. Again, like the difference between the configuration of FIG. 10 as compared to that in FIG. 9, this configuration enables a differential output 1202 a larger correction range for the pn junction reverse bias voltage as compared to the configuration of FIG. 11. This enables not only reduction of the RF imbalance, but sufficient cancellation, while reducing distortion. In FIG. 12, the offset control 1208 includes electronics determining the applicable voltage offsets.

Figure 13:
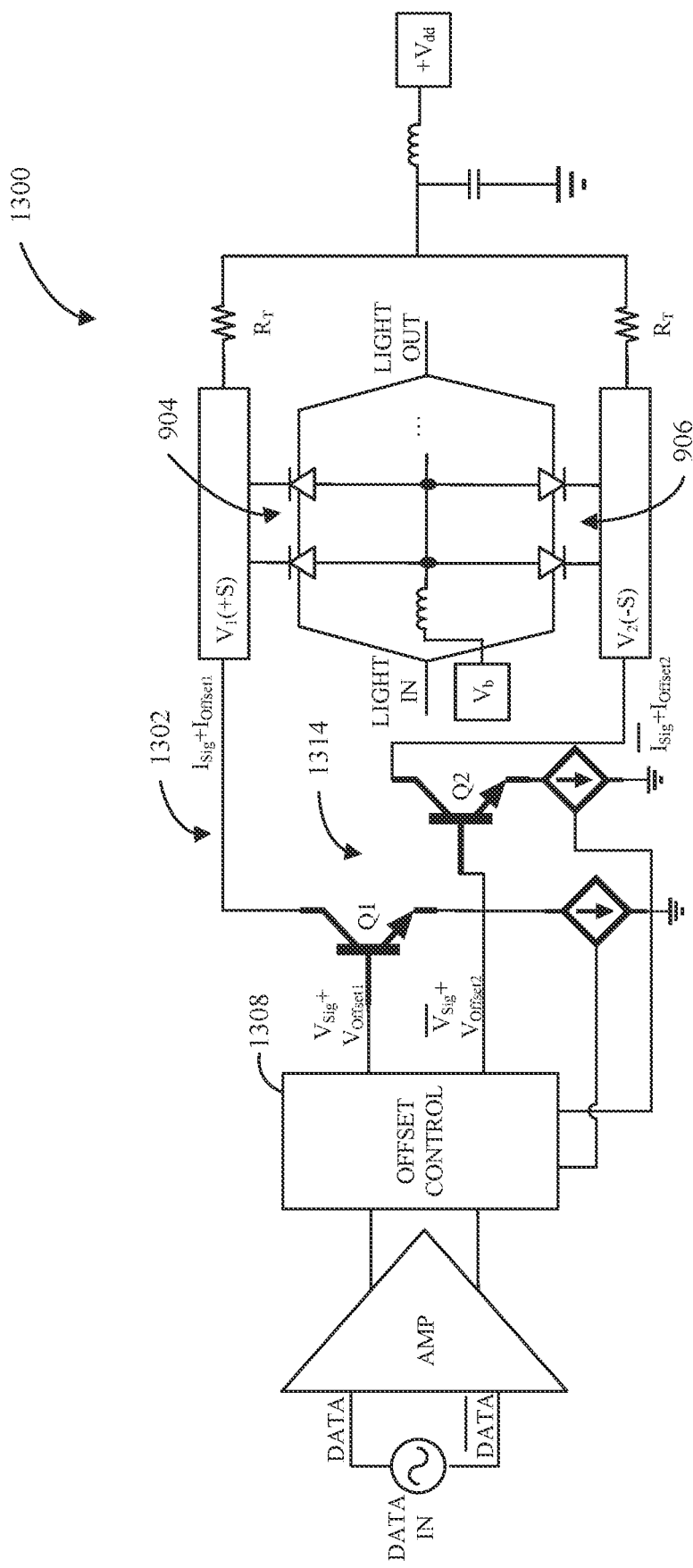
FIG. 13 is a schematic diagram illustrating a further embodiment of a modulator device of the proposed solution using a nppn SPP configuration, driven with a dissimilar DC current from an open collector driver, where a single-ended output is utilized with two transistors controlling the offset current sourced from two independent current sources.

FIG. 13 illustrates a modulator device 1300 of the proposed solution employing an open collector (i.e., a drain for MOS devices) driver (i.e., a current or transconductance driver) with a differential output 1302. Each driver arm 904 and 906 provides a different DC current ($I_{sig}+I_{Offset1}$ and $\overline{I_{sig}}+I_{Offset2}$) responsive to differing voltages $V_{sig}+V_{Offset1}$ and $\overline{V_{sig}}+V_{Offset2}$ applied to the base of the transistors Q1 and Q2, respectively. This results in a dissimilar voltage drop at the termination resistors $R_T$, resulting in a dissimilar reverse bias voltage for the two pn junctions forming the modulator device 1300. This configuration allows using a single bias voltage $V_b$ to bias the pn junctions so that they operate in the depletion mode (i.e., reverse bias operation), but operate with different individual reverse bias voltages Vbias,pn1 and Vbias,pn2, as described above. In this single-ended output embodiment, Q1 and Q2, which control the offset current, are sourced from two independent current sources associated with the open collector driver 1314. In FIG. 12, the offset control 1308 includes electronics determining the applicable voltage offsets.

Figure 14:
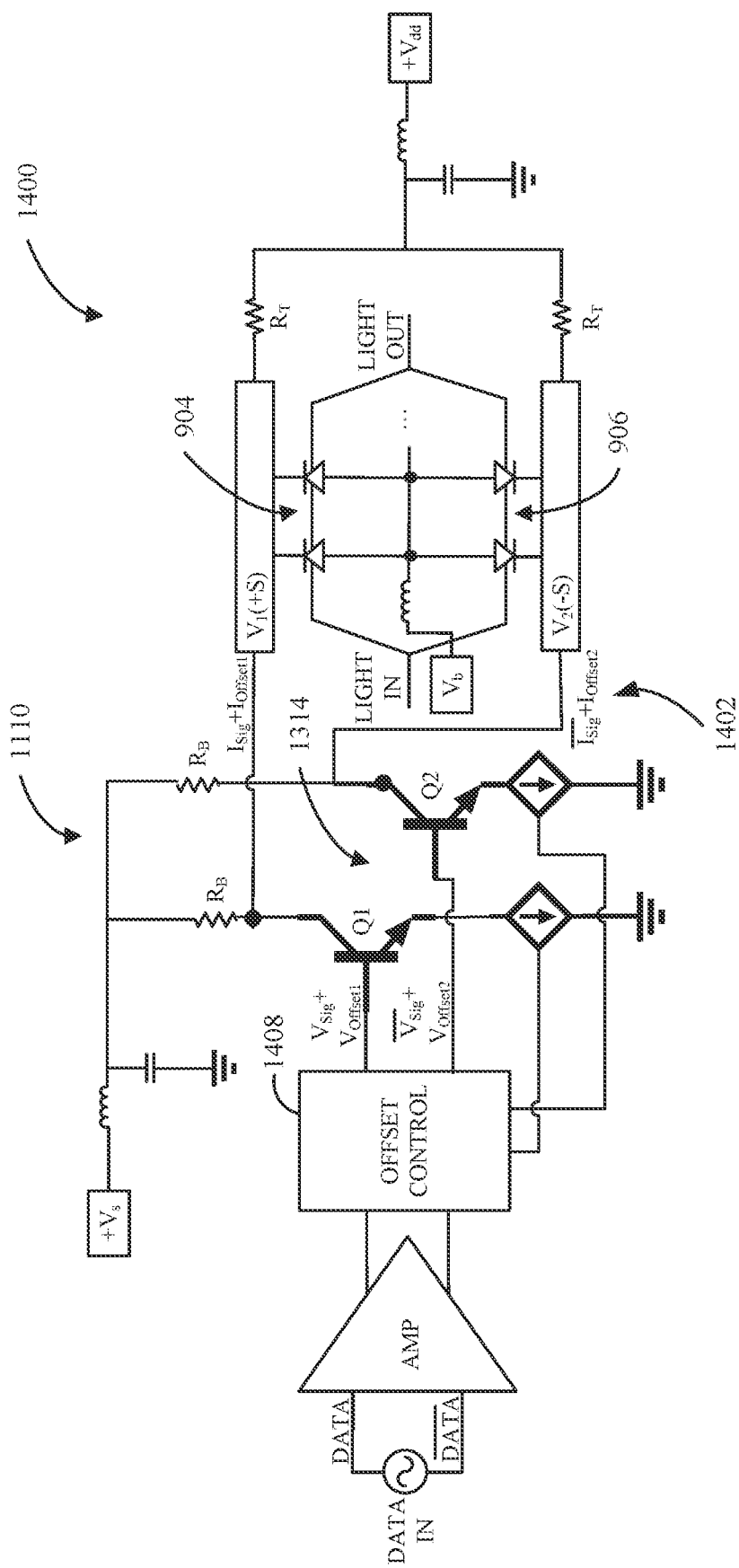
FIG. 14 is a schematic diagram illustrating a further embodiment of a modulator device of the proposed solution using a nppn SPP configuration, driven with a dissimilar DC current from a back-terminated differential driver, where a single-ended output is utilized with two transistors controlling the offset current sourced from two independent current sources.

FIG. 14 illustrates a modulator device 1400 of the proposed solution employing a back-terminated differential driver 1110 with a differential output 1402, whereby each driver arm 904 and 906 provides a different DC current ($I_{Offset1}$ and $I_{Offset2}$) responsive to differing voltages $V_{sig}+V_{Offset1}$ and $\overline{V_{sig}}+V_{Offset2}$ applied to the base of the transistors Q1 and Q2, respectively. Again, this results in a dissimilar voltage drop at the termination resistors $R_T$, resulting in a dissimilar reverse bias voltage for the two pn junctions of the modulator device 1400. This configuration employs a single bias voltage $V_b$ to bias the pn junctions so that they operate in the depletion mode (i.e., reverse bias operation), but operate with different reverse bias voltages Vbias,pn1 and Vbias,pn2, as described above. In this single-ended output embodiment, the transistors Q1 and Q2, which control the offset current, are again sourced from two independent current sources associated with the back-terminated differential driver 1314. In FIG. 12, the offset control 1308 includes electronics determining the applicable offset signals (here, voltage offsets).

In general, the optical devices above describe an optical modulator control circuit that can generate a first input voltage $V_{sig}$ and a second input voltage $\overline{V_{sig}}$. These voltages are determined to produce a target phase modulation between a first optical waveguide arm 904 and a second optical waveguide arm 906 of an optical modulator. An offset control circuit, such as offset control 1008, 1108, 1208, 1308, 1408, is configured to generate a first offset signal $V_{sig}+V_{offset1}$ or $V_{offset1}$ and a second offset signal $\overline{V_{sig}}+V_{offset2}$ or $V_{offset2}$ based on the first input voltage and the second input voltage. Different implementations of a linear modulator driver receive the first offset signal and the second offset signal, and then generate, using the first offset signal, a first output voltage $V_1$ for biasing the first optical waveguide arm and generate, using the second offset signal, a second output voltage $V_2$ for biasing the second optical waveguide arm. The first output voltage is different from the first input voltage and/or the second output voltage is different from the second input voltage.

In the above optical modulator devices, the linear modulator driver comprises an open collector (high impedance current source) architecture to drive the optical (e.g., MZ) modulator to reduce an imbalance of the phase modulation of the optical modulator that, in turn, creates an undesirable phase variation of the optical carrier at the output of the modulator. The imbalance may be caused by fabrication errors in the processing and manufacture of the modulator, offsets (voltage or current) at the output of a driver, or both. As described in additional detail below, other linear modulator driver architectures may be used as the linear modulator driver, such as a differential push-pull amplifier (low impedance, voltage source) architecture that allows a large swing to correct for dissimilarity between the two arms of the optical modulator, and hence reduces or eliminates the imbalance. That is, for example, a linear modulator driver can intentionally introduce an offset current control to create an offset voltage at the driver output to compensate the modulator imbalance, the driver's own imbalance, or both. A feedback mechanism or feedback circuit may be used to measure the offset voltage and provide it as input to an offset control for the driver.

Figure 15:
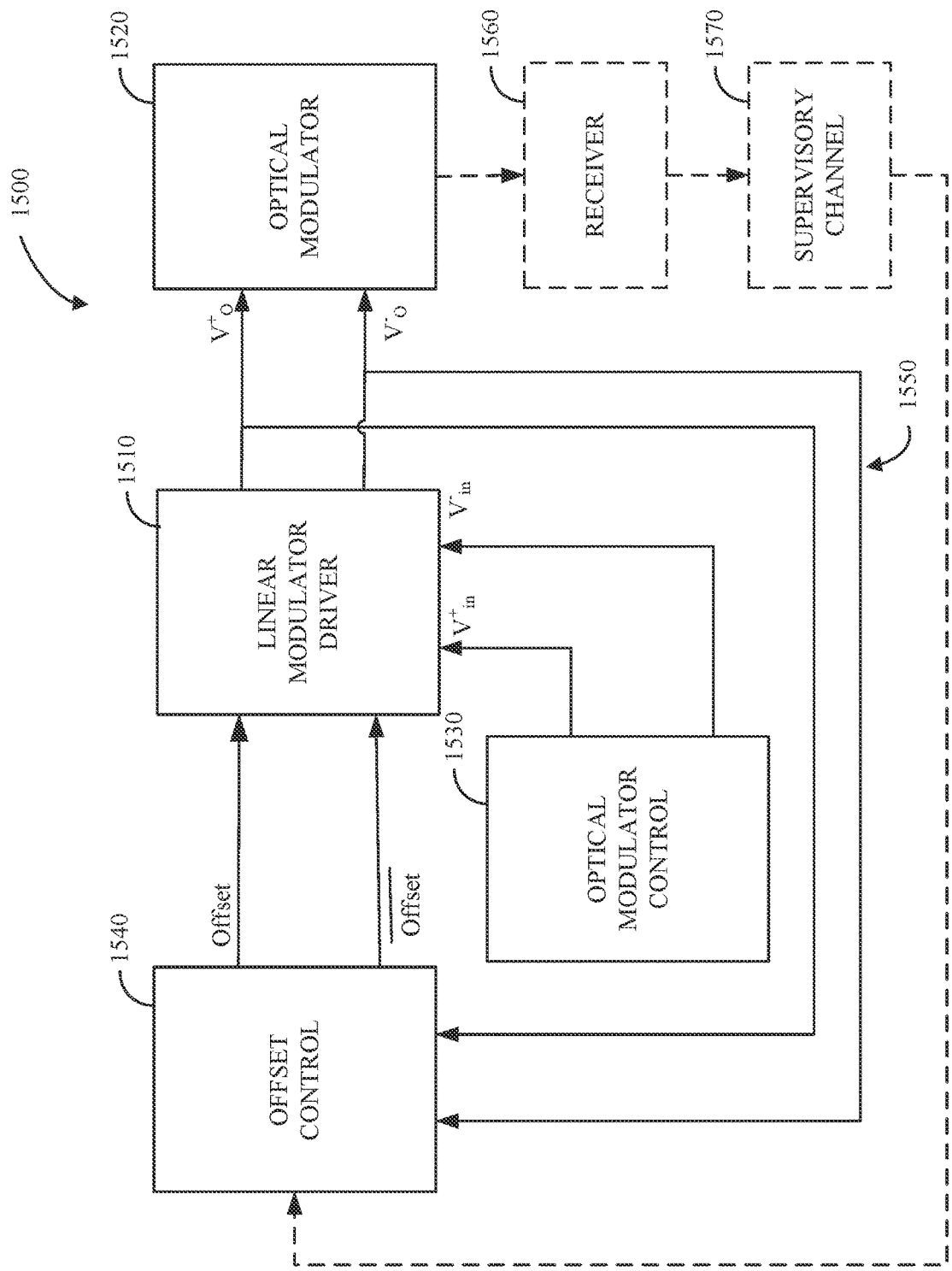
FIG. 15 is a functional block diagram of a modulator device that includes a linear modulator driver coupled to an optical modulator.

Implementations of such a linear modulator driver may be explained generally with reference to the functional block diagram of FIG. 15. In FIG. 15, the optical modulator device or apparatus 1500 includes a linear modulator driver 1510 that is coupled to and drives an optical modulator 1520. As with the above examples, an optical modulator control 1530 is included. The optical modulator control 1530 provides target voltages $V_{in}^+$ and $V_{in}^-$ for operation of the optical modulator 1520. For example, the target voltages $V_{in}^+$ and $V_{in}^-$ (which may also be referred to in this disclosure as input voltages), may be voltages that, when applied to respective electrodes of the optical modulator 1520, cause the optical modulator 1520 to produce the desired output absent the imbalances described above. More specifically, the optical modulator control 1530 is a control circuit that generates a first input voltage $V_{in}^+$ and a second input voltage $V_{in}^-$, where the first input voltage $V_{in}^+$ and the second input voltage $V_{in}^-$ are based on a target phase modulation between a first optical waveguide arm and a second optical waveguide arm of the optical modulator 1520. The target phase modulation may correspond to a target difference between values for Vbias,pn1 and Vbias,pn2, such as a target difference of 0 or close to 0, for example. The target phase modulation may represent a condition wherein the first optical waveguide arm and the second optical waveguide arm exhibit the same phase modulation or a defined different phase modulation.

Offset control 1540, as also included in the previous examples, produces offset signals Offset and $\overline{\text{Offset}}$ for input into the linear modulator driver 1510. Offset control 1540 in this example is an offset control circuit that generates a first offset signal Offset and a second offset signal $\overline{\text{Offset}}$ based on the first input voltage $V_{in}^+$ and the second input voltage $V_{in}^-$. That is, in accordance with the initial discussion of the problem, a control signal for the offset control 1540 introduces a difference DC voltage to the input voltages $V_{in}^+$ and $V_{in}^-$ to either null out the difference in the driver's own output asymmetry, the optical modulator imbalance, or both.

In the examples below, the offset signals to achieve this are current offset signals, $I_{offset}$ and $\overline{I_{offset}}$, that are based on the first input voltage $V_{in}^+$ and the second input voltage $V_{in}^-$ for example, based on the values needed to generate the first output voltage $V_O^+$ (corresponding to V1 in FIG. 4) and the second output voltage $V_O^-$ (corresponding to V2 in FIG. 4) given the target values for these values, e.g., the input voltages $V_{in}^+$ and $V_{in}^-$, to achieve the desired modulator output.

The linear modulator driver 1510 is a driver control circuit that receives the first offset signal Offset and the second offset signal $\overline{\text{Offset}}$. The linear modulator driver 1510 generates the first output voltage $V_O^+$ for biasing the first optical waveguide arm of the optical modulator 1520 using the first offset signal Offset, and generates the second output voltage $V_O^-$ for biasing the second optical waveguide arm of the optical modulator 1520 using the second offset signal $\overline{\text{Offset}}$. At least one of the first output voltage $V_O^+$ is different from the first input voltage $V_{in}^+$ or the second output voltage $V_O^-$ is different from the second input voltage V. More specifically, as explained above with regards to FIG. 7, one of the voltages applied to bias an arm may be kept unchanged while the other may be adjusted to cancel any (e.g., RF) imbalance.

In the examples described herein, each of the voltages applied to bias a respective arm may be changed. That is, one voltage such as the first input voltage $V_{in}^+$ may be reduced to the first output voltage $V_O^+$, while the other such as the second input voltage $V_{in}^-$ may be increased to the second output voltage $V_O^-$. The change to each may be made by the same offset amount, or a different offset amount. Where the first offset signal is the first offset current Ioffset and the second offset signal is the second offset current $\overline{\text{Ioffset}}$, the linear modulator driver 1510 may receive the first input voltage $V_{in}^+$ and the second input voltage $V_{in}^-$, generate the first output voltage $V_O^+$ for biasing the first optical waveguide arm by modifying the first input voltage $V_{in}^+$ using the first offset current Ioffset, and generate the second output voltage $V_O^-$ for biasing the second optical waveguide arm by modifying the second input voltage $V_{in}^-$ using the second offset current $\overline{\text{Ioffset}}$.

An optional feedback mechanism or circuit 1550 may supply the first output voltage $V_O^+$ and the second output voltage $V_O^-$ to the offset control 1540 for use in generating the values for the first offset signal Offset and the second offset signal $\overline{\text{Offset}}$. Another optional feedback mechanism or circuit comprises a receiver 1560 and a supervisory channel 1570 that may feed back a signal based on the output of the optical modulator 1520 as input to the offset control 1540 for modifying the first offset signal and the second offset signal. Each of these circuits is discussed in additional detail below.

Figure 16:
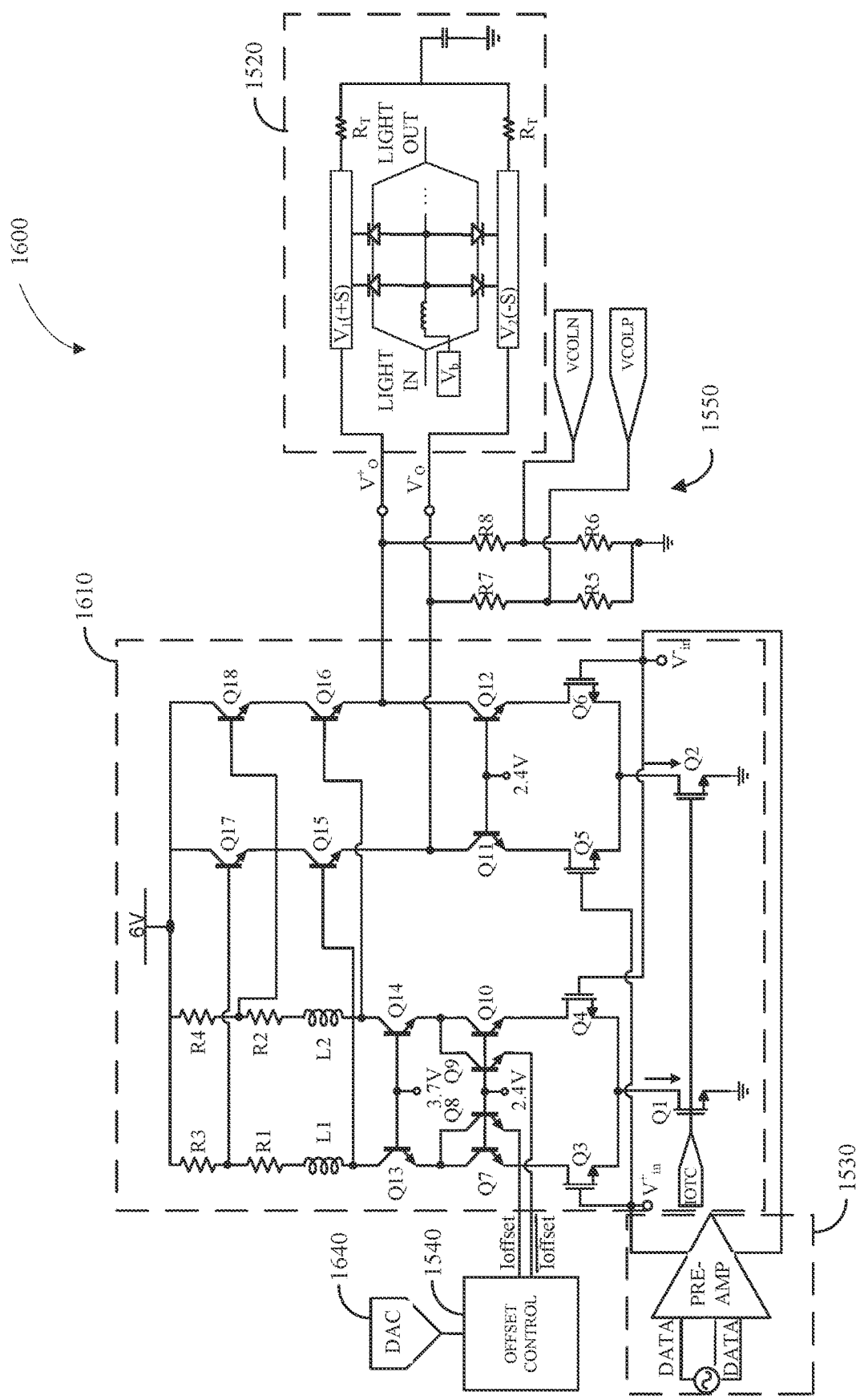
FIG. 16 is a schematic diagram illustrating an embodiment of a modulator device of the proposed solution using a nppn SPP configuration, driven by an asymmetrical DC voltage from a dual series-stacked emitter follower push-pull differential driver.

FIG. 16 is a schematic diagram illustrating an embodiment of a modulator device 1600 of the proposed solution using a nppn SPP configuration, driven by an asymmetrical DC voltage from a dual series-stacked emitter follower push-pull differential driver 1610 as the linear modulator driver 1510. This linear modulator driver 1610 is a modification to a driver architecture presented in the paper: "57.5 GHz Bandwidth 4.8Vpp Swing Linear Modulator Driver for 64Gbaud m-PAM Systems", by A. Zandieh in 2017. That driver architecture includes, in an output stage, a linear series-stacked differential emitter follower and a linear cascode. In the linear modulator driver 1610 of FIG. 16, the linear series-stacked differential emitter follower comprises the transistors Q15-Q18 and the linear cascode comprises MOSFET-transistor (MOS-HBT) pairs including Q11 and Q5 and Q12 and Q6.

In addition, the linear modulator driver 1610 includes two transistors Q8 and Q9, which are driven by two offset signals, in this example the first current $I_{offset}$ and the second current $\overline{I_{offset}}$, in the second linear cascode to raise the signal level driving two further series-stacked emitter followers (i.e., the transistor pairs Q3 and Q7 and Q4 and Q10). As shown, the first current offset $I_{offset}$ and the second current $\overline{I_{offset}}$ are supplied by the offset control 1540 using a control signal provided through a digital to analog converter DAC 1640. The control signal corresponds to the control signal described above that introduces a difference DC voltage value in the p and n output complements. In this example, the offset control is fed by a control current IOOFS (current output offset signal) using a (e.g., on-chip) DAC 1640. However, the offset control 1540 may also be fed by a (e.g., off-chip) control voltage.

The optical modulator control 1530, like the control shown in the previous solutions, includes a source AC signal that provides an alternating DATA signal that is amplified to provide inputs to the linear modulator driver 1510. In this case, the amplifier is referred to as a pre-amp to reflect that the first input voltage $V_{in}^+$ and the second input voltage $V_{in}^-$ are subsequently modified by the linear modulator driver 1510. Specifically, the optical modulator control 1530 applies the first input voltage $V_{in}^+$ and the second input voltage $V_{in}^-$ to a gate of each of the linear cascodes, applying the first input voltage $V_{in}^+$ to the gate of the transistors Q3, Q5 and applying the second input voltage $V_{in}^-$ to the gate of the transistors Q4, Q6. The linear cascodes are biased by transistors Q1, Q2 having a common voltage applied to their gates (e.g., based on the current IOTC), and with their respective sources coupled to ground.

As mentioned, driving the two transistors Q8 and Q9 by the first current offset $I_{offset}$ and the second current offset $\overline{I_{offset}}$ in the second linear cascode raises the signal level driving two series-stacked emitter followers. This raised signal level results in a dissimilar voltage drop at the resistor dividers R1/R3 and R2/R4, which in turn results in a dissimilar voltage at the base of each emitter follower series-stacked pair Q15/Q18 and Q16/Q18. As a result, the output appearing at the lower emitter followers Q15, Q16 are level shifted down from the voltage appearing at their respective bases. This, in turn, results in a DC difference at the output, namely the second output voltage $V_O^-$ and the first output voltage $V_O^+$ and a dissimilar reverse bias voltage for the two pn junctions forming the optical modulator 1520, in this example a SPP MZ modulator.

This configuration allows using a single bias voltage Vb to polarize the pn junctions so that they operate in the depletion mode (reverse bias operation), and also operate with different reverse bias voltages Vbias,pn1 and Vbias, pn2, as explained earlier. Specifically, and referring to FIG. 4, the change in the reverse bias voltage applied to pn junction i relates to the amount of current offset $\Delta I_{offset}$ provided to the driver 1610, as follows:

$$\Delta V_{bias} = (R1+R3) \Delta I_{offset} \quad (7)$$

In equation (7), it is assumed that $\Delta I_{offset} = I_{offset} - \overline{I_{offset}}$, and the resultant voltage drop at R1+R3 equals that at R2+R4.

In an example of operation of the optical modulator device 1600, a DC current is shared between the left and right cascodes, the amount of current offset between Q13 and Q14 could be limited to about ±10% of the driver current (i.e., about ±5 mA). Assuming values of R1=48Ω and R3=12Ω, a drop across R1+R3 leads to a change in voltage of ±0.30V. Operating pn junction 1 at 1.7V and pn junction 2 at 2.3V as described in the example of FIG. 8 leads to a RF imbalance of −0.07. Although the driver does not cancel the RF imbalance, this RE imbalance can be sufficient to make the optical modulator 1520 meet an RF imbalance design specification, meet a desired link budget, or both. The use of such current offset capability within the linear modulator driver 1610 can provide sufficient adjustment in the pn junction reverse bias to shift the statistical distribution of the RF imbalances and significantly increase the resulting yield.

Implementations of the optical modulator device 1500, such as the optical modulator device 1600, in addition to compensating for the modulator inefficiency, can also compensate for fabrication errors in components of the driver. For example, the optical modulator device 1600 can compensate for fabrication errors in the resistor divider networks comprising $(R_1+R_3)$ and $(R_2+R_4)$. In an ideal scenario where the modulator electrodes have no fabrication error and have identical efficiencies, the same values for the DC output voltages $V_O^+$ and $V_O^-$ would be desired on the respective electrodes and $\Delta I_{offset}=0$. However, fabrication error in one or both of the two resistors in the resistor divider network driving the two series-stacked emitter followers, may result in dissimilar values for the first output voltage $V_O^+$ and the second output voltage V. In turn, the dissimilar values would lead to unequal reverse bias voltages for the two pn junctions. In such a case, the transistors Q8 and Q9 can apply different current offsets, so that the resultant voltage drops across R1+R3 and R2+R4, are identical. In other words, $(R1+R3)I_{offset} = (R2+R4)\overline{I_{offset}}$.

As another example, the optical modulator device 1600 can compensate for fabrication errors in the left cascode transistors Q3 and Q4. Such errors may result where the respective transconductance gain $g_n$ and/or the respective current gain β of the two transistors Q3, Q4 are not identical. The errors result in differing currents through Q13 and Q14. To compensate, dissimilar values for $\Delta I_{offset}$ may be applied to the emitter of Q8 and Q9.

For the above compensation, the optional feedback mechanism or circuit 1550 may be implemented that passes feedback voltages corresponding to the first output voltage $V_O^+$ and the second output $V_O^-$ to the offset control 1540. The offset control 1540 can then modify the first offset signal (e.g., $I_{offset}$), the second offset signal (e.g., $\overline{I_{offset}}$), or both, while maintaining the same voltage offset at the output to the optical modulator 1520 that corrects for manufacturing errors therein, if any. In FIG. 16, the feedback circuit 1550 includes respective resistor divider networks R5/R7 and R6/R8 are used to measure the output or voltage offset, generally through an analog to digital converter (ADC).

Figure 17:
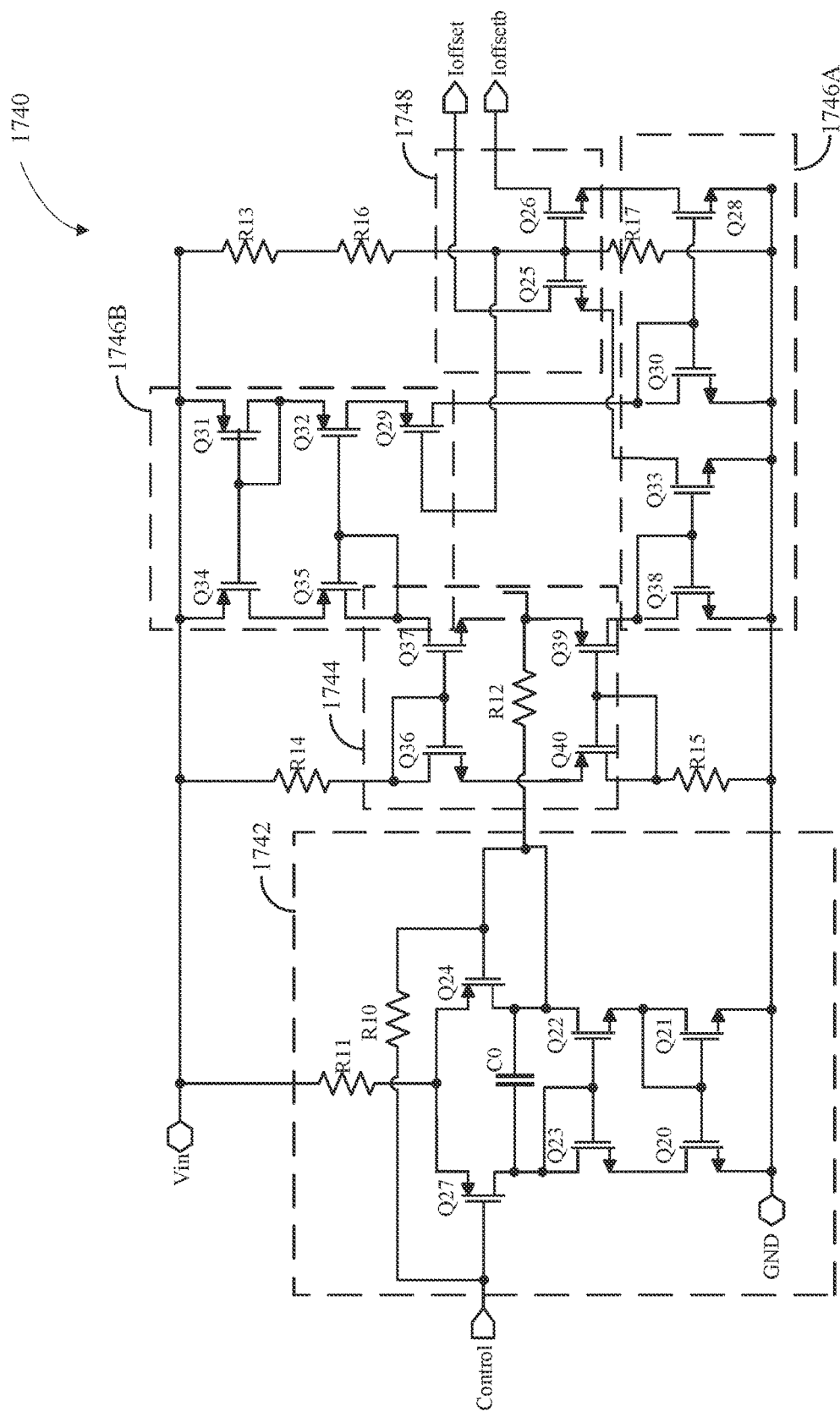
FIG. 17 is a schematic diagram of an offset control that could be used in the modulator device or apparatus of FIG. 16.

Various circuits may achieve the results indicated for the offset control 1540 above. One example is shown in FIG. 17, which is a schematic diagram of an offset control 1740 that could be used in the modulator device or apparatus 1600 of FIG. 16 as the offset control 1540. In general, the offset control 1740 includes an input buffer 1742, followed by a current steering circuit 1744 that is based on the direction of current in R12, by an N-channel mirror 1746A and a P-channel mirror 1746B, and a common gate output buffer 1748. Inputs include the positive supply voltage yin (in an example 2.8 V), and Control, which controls the offset signals. In this example, Control controls the offset currents Ioffset and Ioffsetb) and is set by a digital to analog converter from the feedback circuit (such as DAC 1640 from feedback circuit 1550), The value for Control is set by the measured voltages VCOLP and VCOLN. While the offset control 1740 may use other switching devices such as bipolar transistors for switching, the example shown in FIG. 17 uses MOSFETs.

Figure 18:
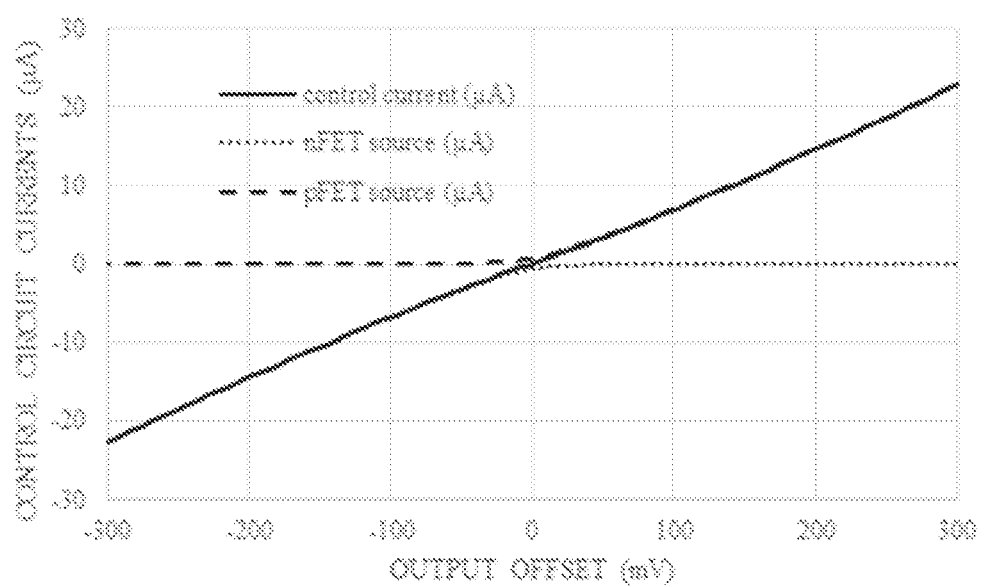
FIG. 18 is a graph of control currents of the offset control of FIG. 17 versus values for a voltage offset applied to the optical modulator.

In more detail, the offset control 1740 is typically fed by a control current IOOFS or a control voltage as discussed with regards to FIG. 16. Once passed through the input buffer 1742, the control current feeds the sources of an nFET Q37 and a pFET Q39, respectively, that belong to the current steering circuit 1744. The current steering circuit 1744 may be or include a class AB amplifier. The currents of the current steering circuit 1744 may be described with reference to the graph of FIG. 18. When the control current is 0 uA, both the nFET Q37 and the pFET Q39 are slightly turned on. When the control current is applied in the forward direction, the nFET Q37 is turned off and the pFET Q39 starts to conduct. Conversely, when the control current is applied in the reverse direction, the pFET Q39 is turned off and the nFET Q37 conducts. In FIG. 18, these currents—the control current, the nFET control current, and the pFET control current, are plotted against values for the voltage offset applied to the optical modulator 1520 (also referred to as the output offset). The output offset may be determined as the voltage difference (in mV) between $V_O^+$ and $V_O^-$ (e.g., $V_O^+$-$V_O^-$) in some implementations.

The drains for each of the nFET Q37 and the pFET Q39 are connected to their respective gain current mirrors, namely the N-channel mirror 1746A and the P-channel mirror 1746B. For a control current in the positive direction, the drain of the pFET Q39 feeds into transistors Q38, Q33 of the N-channel mirror 1746A, and accordingly drives the output Ioffset through the transistor Q25. The drain of the nFET Q37 feeds into the transistors Q29, Q31, Q32, Q34, and Q35 of the P-channel mirror 1746B, which feeds transistors Q30 and Q28 of the N-channel mirror 1746A, which in turn drives the output Ioffsetb through the transistor Q26.

Figure 19:
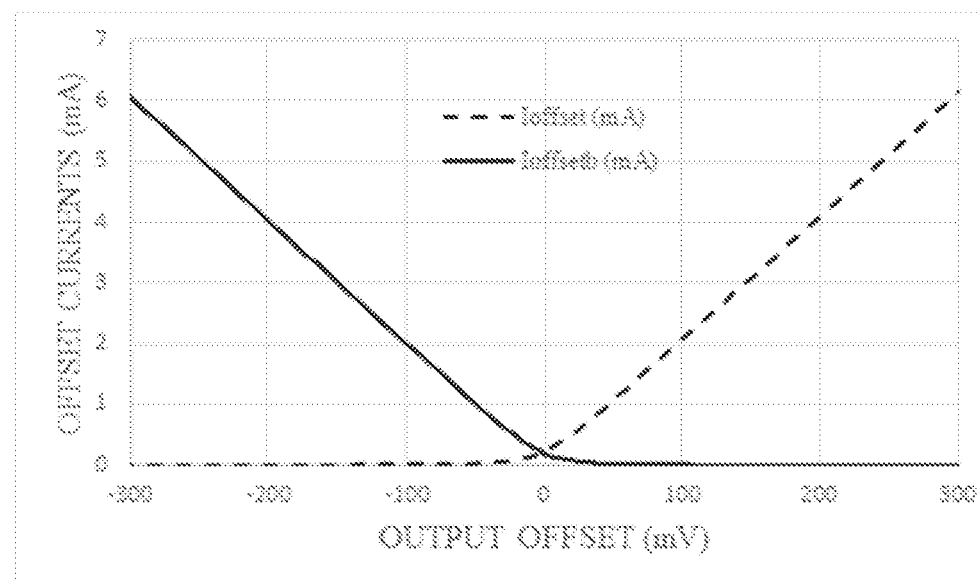
FIG. 19 is a graph of offset currents generated at the output of the offset control of FIG. 17 versus values for a voltage offset applied to the optical modulator.

At the common gate output buffer 1748, the gates of the transistors Q29, Q25, and Q26 are connected to a common d.c. bias point generated by the resistive divider R13, R16, and R17. That is, the transistors Q29, Q25, and Q26 are all common gate transistors used to isolate the drains of the transistors Q32, Q33, and Q28 from their respective loads. The outputs from the common gate output buffer 1748 correspond to the first offset signal (e.g., $I_{offset}$) and the second offset signal (e.g., $\overline{I_{offset}}$) in FIGS. 15 and 16. FIG. 19 is a graph of these offset currents generated at the output of the offset control 1740. They are plotted against values for the voltage offset (e.g., the output offset $V_O^+$-$V_O^-$) applied to the optical modulator 1520.

Figure 20:
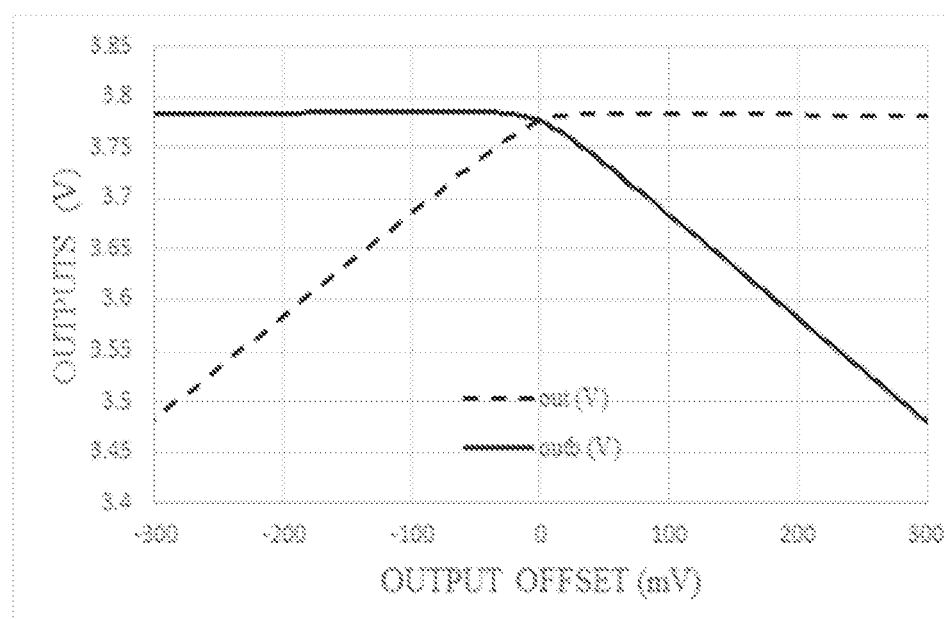
FIG. 20 is a graph of offset voltages at the output of the linear modulator driver of FIG. 16 versus values for a voltage offset applied to the optical modulator.

FIG. 20 is a graph of offset voltages at the output of the linear modulator driver 1620 of FIG. 16 versus values for a voltage offset (e.g., the output offset $V_O^+$-$V_O^-$) applied to the optical modulator 1520. This demonstrates the behavior of the linear modulator driver 1620 at the outputs $V_O^+$ (out) and $V_O^-$ (outb) with the two offset signals (e.g., offset currents $I_{offset}$ and $I_{offsetb}$) input from the offset control 1540.

Referring back to FIG. 15, the optional feedback circuit 1550 is described above. The feedback circuit 1550 may be used in conjunction with the other optional feedback mechanism or circuit that comprises the receiver 1560 and the supervisory channel 1570. To distinguish the latter feedback circuit, it may be referred to as an optical modulator feedback circuit. In general, the optical modulator feedback circuit feeds back a signal based on the output of the optical modulator 1520 as input to the offset control 1540 for modifying the first offset signal and the second offset signal.

More specifically, the optical modulator feedback circuit may receive an output of the optical modulator, determine a performance measure of the optical modulator using the output, and transmit an input signal to the offset control circuit to modify the first offset signal and the second offset signal using the performance measure.

The output of the optical modulator 1520 may be a light output received by the receiver 1560, such as a receiver familiar to those skilled in the art. The receiver 1560 may determine the performance measure. For example, the performance measure may be an indication of the target phase modulation between the first optical waveguide arm and the second optical waveguide arm of the optical modulator 1520. The performance measure may be chirp in the output of the optical modulator 1520. The performance measure may be a transmitter dispersed system performance measure such as the signal-to-noise ratio (SNR), the required optical signal-to-noise ratio (ROSNR), and/or the implementation noise (IMN). The supervisory channel 1570 may use the performance measure to determine the input signal for the offset control 1540. For example, the input signal may be a new offset signal (e.g., an offset current) for input to the offset control 1540 at the DAC 1640 shown in FIG. 16.

The output of the linear modulator driver, more specifically, the voltage offset between the first output voltage $V_O^+$ and the second output voltage $V_O^-$ may be calibrated to minimize a difference between the target phase modulation and an actual phase modulation of the optical modulator. This compensates for the transmitter chirp. The two feedback circuits may be used for this purpose. That is, calibrating the voltage offset may include adjusting the control signal (e.g., IOOFS) to the offset control circuit 1540 that determines the first offset signal and the second offset signal until the first output voltage is equal to the second output voltage (e.g., such that VCOLN and VCOLP provided by the feedback circuit 1550 in FIG. 16 are equal). This corrects for any asymmetry in the p- and n-portions of the linear modulator driver 1510. Then, the output of the optical modulator 1520 is measured or otherwise determined that indicates the actual phase modulation (e.g., by the optical modulator feedback circuit). This output may correspond to the performance measure described previously. The voltage offset is calibrated (minimizing chirp) when the actual phase modulation (as indicated by the performance measure) is within a defined range about the target phase modulation. This may occur when, for example, the performance measure is below a defined maximum value, such as with a maximum chirp or a defined link budget.

In some implementations, these steps of adjusting the control signal to the offset control circuit 1540 and determining the output of the optical modulator 1520 may need to be repeated. For example, where there is an imbalance in the arms of the optical modulator 1520, the first adjustment of the control signal will not address that imbalance. Accordingly, calibrating the voltage offset may include, responsive to determining that the actual phase modulation is outside the defined range about the target phase modulation, repeating the adjusting and the measuring until the actual phase modulation is within the defined range about the target phase modulation. This process negates the overall driver and modulator imbalances, resulting in improved system performance and/or chirp.

Figure 21:
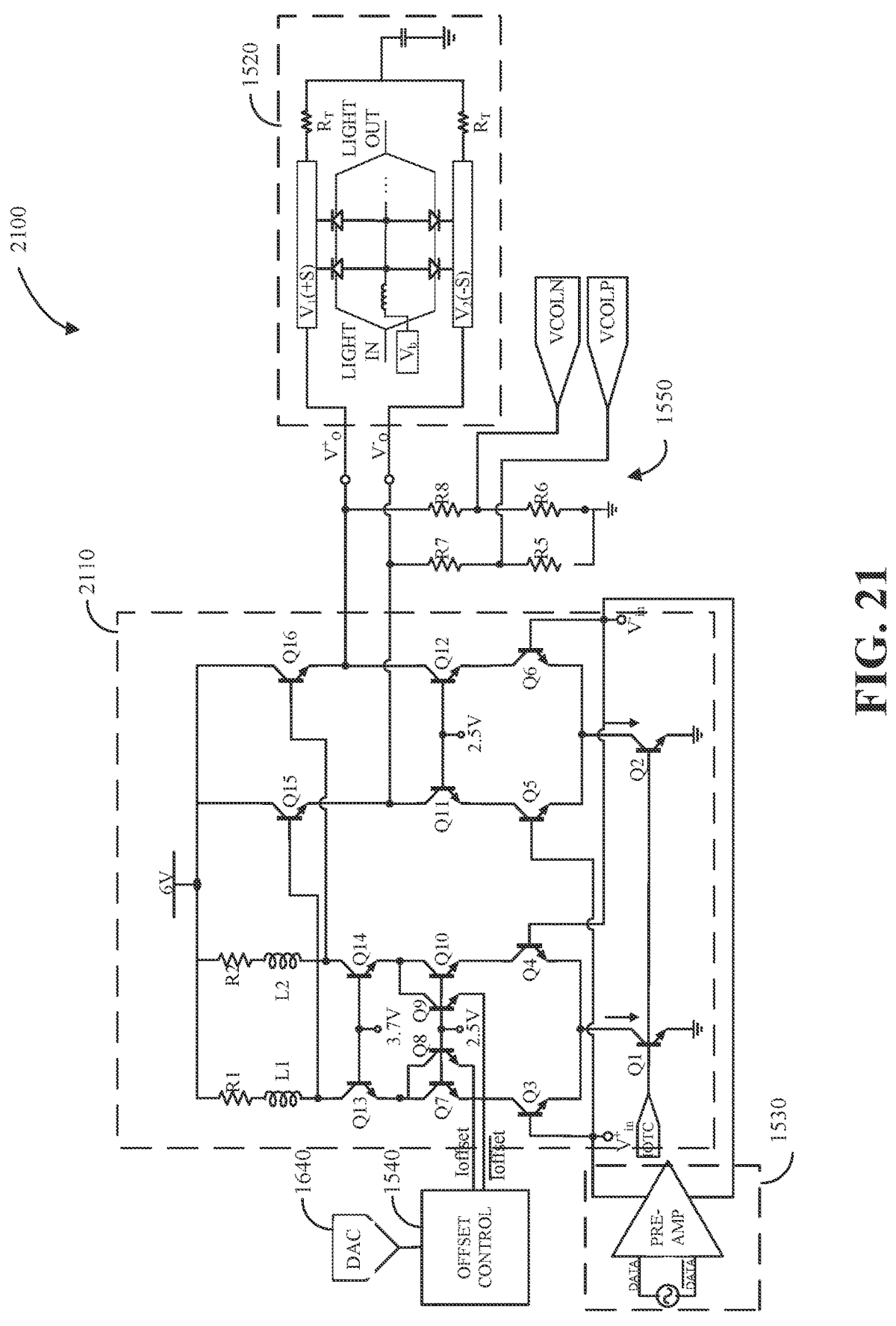

Another variation of the optical modulator devices described herein is shown in FIG. 21. FIG. 21 is a schematic diagram illustrating an embodiment of a modulator device 2100 of the proposed solution using a nppn SPP configuration. This implementation of the optical modulator device 1500 is similar to the optical modulator device 1600. However, instead of a linear modulator driver 1610 comprising a dual series-stacked emitter follower push-pull differential driver, the linear modulator driver 1710 comprises a single emitter follower push-pull differential driver. In this variation, the MOS transistors in the current sources and lower part of the left/right cascode are changed to HBT. This architecture may also be referred to as a Single Emitter Follower Push-Pull (SEFPP). The offset control 1540 may comprise the offset control circuit of FIG. 17. A detailed operation of this driver is omitted as it is cumulative to the description of the operation of the driver of FIG. 16.

Figure 22:
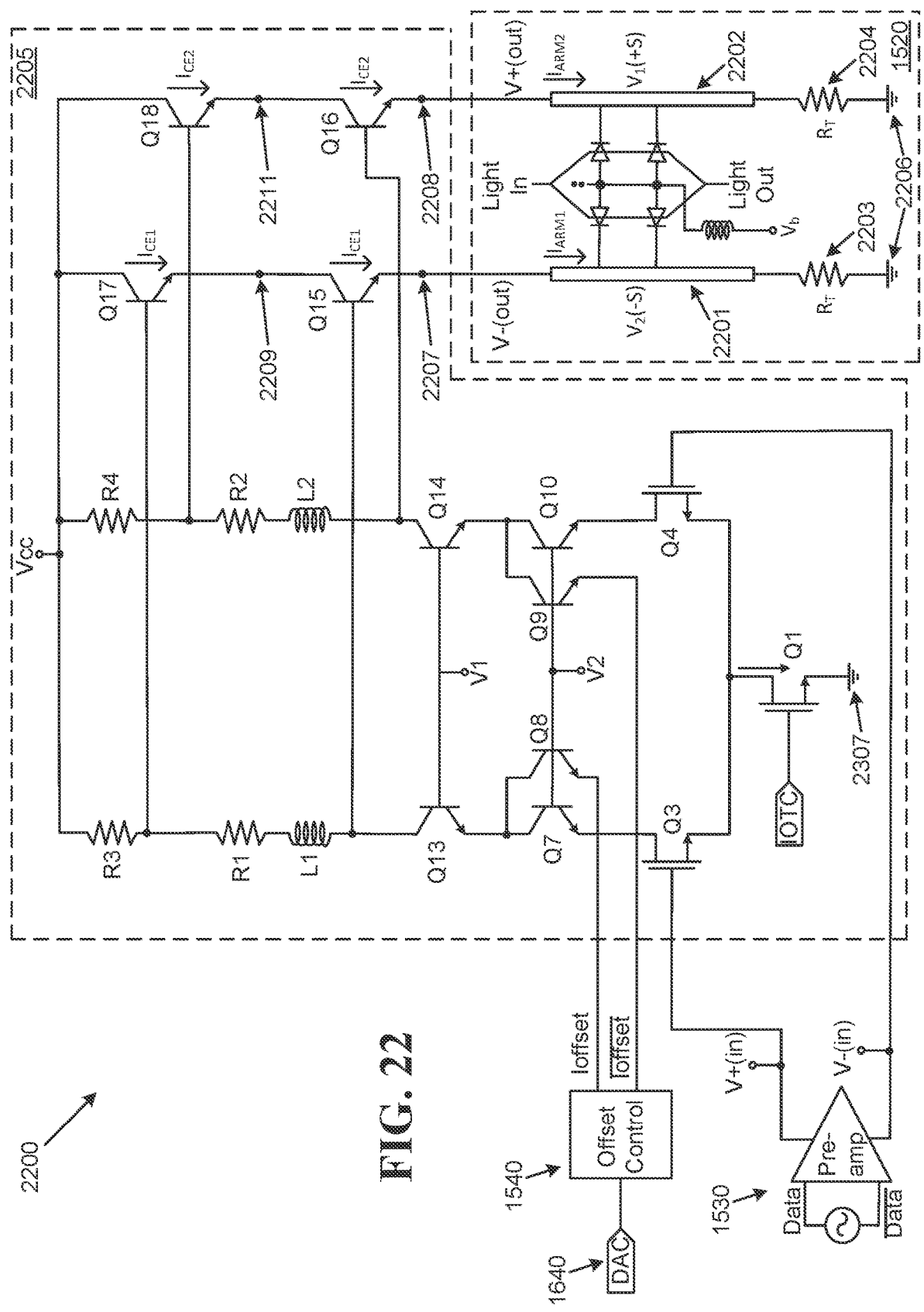
FIG. 22 is a schematic diagram illustrating an embodiment of an optical modulator device that is driven by an asymmetrical DC voltage provided by a linear modulator driver having a dual series-stacked emitter follower stage.

FIG. 22 is a schematic diagram illustrating an embodiment of an optical modulator device 2200 that includes an optical modulator 1520 driven by an asymmetrical DC voltage that is provided by a linear modulator driver 2205 having a dual series-stacked emitter follower stage. As mentioned above, the driver architecture in Zandieh includes a linear series-stacked differential emitter follower and a linear cascode in an output stage. The linear modulator driver 1610 illustrated in FIG. 16, which is a modification of Zandieh and is in accordance with the disclosure, includes a linear series-stacked differential emitter follower (transistors Q15-Q18) and a linear cascode circuit (transistors Q11, Q12, Q5, Q6, and Q2).

The linear cascode circuit in the linear modulator driver 1610 illustrated in FIG. 16 provides various advantages in some applications. However, in some other applications, the linear cascode circuit may impose an undesirable current-related burden upon the linear series-stacked differential emitter follower and may also introduce an undesirable load-related limitation upon the modulator device 1600. The current-related burden and the load-related limitation may be perfectly acceptable in some applications but may be undesirable, in at least some other applications. For example, in some of these other applications, it may be desirable to use of a lower supply voltage for operating the linear modulator driver 1610. It may also be desirable to address the load-related limitation in order to obtain a larger operational bandwidth.

The current-related burden referred to above pertains to a collector-to-emitter current ($I_{CE}$) flowing through each of Q15 and Q16 and routed through two current branches—a first current branch associated with the optical modulator 1520 and a second current branch associated with the linear cascode circuit (i.e., transistors Q11, Q12, Q5, Q6, and Q2 shown in FIG. 16).

It may be desirable to reduce the collector-to-emitter current flow ($I_{CE}$) through each of Q15 and Q16 by at least eliminating the second current branch associated with the linear cascode circuit. The collector-to-emitter current flow ($I_{CE}$) through each of Q15 and Q16 is typically sustained by a supply voltage Vcc that is applied to a collector of the transistor Q17 and to a collector of the transistor Q18. The supply voltage Vcc provided to the modulator device 1600 illustrated in FIG. 16 is 6V.

It is desirable, in at least some applications, to use a lower supply voltage. Lowering the supply voltage provides various benefits such as, for example, lower hardware cost, higher component packaging density, and higher thermal efficiency.

The undesirable load-related limitation referred to above can be caused by a capacitive load component of the linear cascode circuit. The capacitive component may undesirably load the emitters of the linear series-stacked differential emitter follower and may reduce an operational bandwidth of the optical modulator 1520. A wider operational bandwidth may be achieved if the capacitive component is reduced or eliminated.

In addition to the current-related burden and the load-related limitation described above, another detrimental factor associated with the linear cascode circuit can be attributed to structural mismatches that may be caused during manufacture of the modulator device 1600. A first example of such a structural mismatch is a structural mismatch created between the transistor Q11 and the transistor Q12 during lithography/fabrication, and/or between the transistor Q5 and the transistor Q6 during lithography/fabrication. Such structural mismatches can lead to unequal amplitude current flows through the two branches of the linear cascode circuit (Q11 and Q5 constitute a first branch and Q12 and Q6 constitute a second branch). In some cases, an unequal current flow can be remedied in accordance with disclosure by use of the offset control 1540. However, it is desirable to eliminate this remedial operation if feasible, so as to improve the overall operation of the modulator device 1600.

The modulator device 2200 illustrated in FIG. 22 addresses issues such as the ones described above, by eliminating the linear cascode circuit in the linear modulator driver 2205. The linear modulator driver 2205 is another example embodiment in accordance with the disclosure of the linear modulator driver 1510 shown in FIG. 15. Eliminating the linear cascode circuit results in a current flow ($I_{ARM1}$) through a first optical waveguide arm 2201 of the optical modulator 1520 being equal to the collector-to-emitter current flow ($I_{CE1}$) through the transistor Q15 (and the transistor Q17) of the linear modulator driver 2205. Similarly, a current flow ($I_{ARM2}$) through a second optical waveguide arm 2202 of the optical modulator 1520 is equal to the collector-to-emitter current flow ($I_{CE2}$) through the transistor Q16 (and the transistor Q18) of the linear modulator driver 2205.

Furthermore, as a result of eliminating the linear cascode circuit, a load imposed upon the linear modulator driver 2205, specifically upon an emitter of the transistor Q15, consists of an impedance of the first optical waveguide arm 2201 of the optical modulator 1520 coupled in series with a terminating resistor 2203. A capacitive component of the impedance presented by the linear cascode circuit to the linear series-stacked differential emitter follower (in the form of the linear cascode circuit shown in FIG. 16) has been eliminated, thereby increasing the operational bandwidth of the optical modulator 1520.

Another load imposed upon the linear modulator driver 2205, specifically upon an emitter of the transistor Q16, consists of an impedance of the second optical waveguide arm 2202 of the optical modulator 1520 coupled in series with a terminating resistor 2204. Here again, a capacitive component of the impedance presented by the linear cascode circuit to the linear series-stacked differential emitter follower (in the form of the linear cascode circuit shown in FIG. 16) has been eliminated, thereby increasing the operational bandwidth of the optical modulator 1520.

Both the terminating resistor 2203 and the terminating resistor 2204 are coupled to a ground node 2206 in this example implementation. In another implementation, the terminating resistor 2203 and the terminating resistor 2204 may be coupled to a voltage supply rather than to the ground node 2206, such as, for example, a negative voltage supply.

The configuration and operations of other components of the modulator device 2200 can be similar to those described above with reference to the modulator device 1610. Thus, for example, the offset control circuit 1540 can be operated to set the transistor Q15 in a first operating state for providing a first operating bias to the first optical waveguide arm 2201 of the optical modulator 1520 and the transistor Q16 in a second operating state for providing a second operating bias to the second optical waveguide arm 2202 of the optical modulator 1520. The second operating bias can be different than the first operating bias. The first optical waveguide arm 2201 of the optical modulator 1520 may then exhibit a first modulation characteristic and the second optical waveguide arm 2202 of the optical modulator 1520 may exhibit a second modulation characteristic that is different than the first modulation characteristic.

More particularly, the offset control circuit 1540 is configured to place the transistor Q15 in the first operating state based on an amplitude of a first collector-to-emitter current flow ($I_{CE1}$) through the transistor Q15. The offset control circuit 1540 is further configured to place the transistor Q16 in the second operating state based on an amplitude of a second collector-to-emitter current flow ($I_{CE2}$) through the transistor Q16.

In this embodiment, the linear modulator driver 2205 includes two transistors Q8 and Q9, that are driven by two offset signals. The two offset signals include a first current offset $I_{offset}$ and a second current $\overline{I_{offset}}$ produced by the offset control 1540 under control of the DAC 1640 in the manner described above.

The optical modulator control 1530, which operates in a manner described above, includes a source AC signal that provides an alternating DATA signal. The alternating DATA signal is amplified to provide inputs to the linear modulator driver 2205. In this case, the amplifier is referred to as a pre-amp to reflect that the first input voltage $V_{in}^+$ and the second target voltage $V_{in}^-$ are subsequently modified by the linear modulator driver 2205. Specifically, the optical modulator control 1530 applies the first target voltage $V_{in}^+$ to a gate of the transistor Q3 and the second target voltage $V_{in}^-$ to a gate of the transistor Q4. The emitters of the transistors Q3 and Q4 are coupled to a transistor Q1 whose source is coupled to a ground node 2307.

As indicated above, the optical modulator device 2200 excludes the linear cascode circuit (transistors Q11, Q12, Q5, Q6, and Q2) that is a part of the of the optical modulator device 1600 shown in FIG. 16. Consequently, in this embodiment, the IOTC control that is applied to the gate of the transistor Q1 is not used to control the transistor Q2 of the linear cascode circuit. Getting rid of the control operation upon the transistor Q2 of the eliminated linear cascode circuit provides some advantages such as, for example, eliminating current draw by the transistor Q2 (and associated linear cascode circuit) and eliminating the need to address a structural mismatch, if present, between the transistor Q1 and the transistor Q2.

Furthermore, as described above, driving the two transistors Q8 and Q9 by use of the first current $I_{offset}$ and the second current $\overline{I_{offset}}$ results in a dissimilar voltage drop at the resistor dividers R1/R3 and R2/R4, which in turn results in a dissimilar voltage being applied to the base of each emitter follower series-stacked pair Q17/Q18 and Q15/Q16. Consequently, the voltage output appearing at the emitters of the transistors Q15 and Q16 are level shifted down from the voltage appearing at their respective bases. This, in turn, results in a DC difference at the output, namely the second output voltage $V_O^-$ and the first output voltage $V_O^+$ and a dissimilar reverse bias voltage for the two pn junctions forming the optical modulator 1520. A single bias voltage $V_b$ is used to polarize the pn junctions of the optical modulator 150 (a SPP MZ modulator) so that the pn junctions operate in a depletion mode of operation (reverse bias operation), and also operate with different reverse bias voltages Vbias, pn1 and Vbias,pn2, as described above.

In an example operation of the linear modulator driver 2205, an amount of current offset between Q13 and Q14 could be limited to about ±10% of the driver current (i.e., about ±5 mA). When the supply voltage is at 6V, the voltage V1 applied to the base of the transistors Q13 and Q14 can be, for example, about 3.7V and the voltage V2 applied to the base of the transistors Q8 and Q9 can be, for example, about 2.4V. When the supply voltage Vcc is reduced from 6V, the values of the resistors R1, R3, R4 and R2 can be modified such that the voltages V1 and V2 are correspondingly reduced.

The linear modulator driver 2205 may be further operated to address issues such as, for example, structural mismatches that may be introduced into various components of the modulator device 2200 during manufacture and/or may be present in the optical modulator 1520. Some details pertaining to such operations have been provided above with reference to the linear modulator driver 1610.

Furthermore, in some applications, the linear modulator driver 2205 can include an optional feedback mechanism or circuit (such as the circuit 1550 described above with reference to the linear modulator driver 1610). In this embodiment, the circuit 1550 that is shown in FIG. 16 can be coupled to various nodes of the linear modulator driver 2205. In an example implementation, the circuit 1550 (or any other feedback tap) can be coupled to the emitters of the transistor Q15 and the transistor Q16 (node 2307 and node 2208 respectively) in a manner similar to that illustrated in FIG. 16 for the modulator device 1600. In another example implementation, the circuit 1550 (or any other feedback tap) can be coupled to the collectors of the transistor Q15 and the transistor Q16 (node 2209 and node 2211 respectively) instead. Coupling the circuit 1550 to the collectors of the transistors Q15 and Q16 may provide certain advantages such as, for example, eliminating a capacitive loading (and/or parasitic loading) of the arms of the optical modulator 1520 by the circuit 1550.

Figure 23:
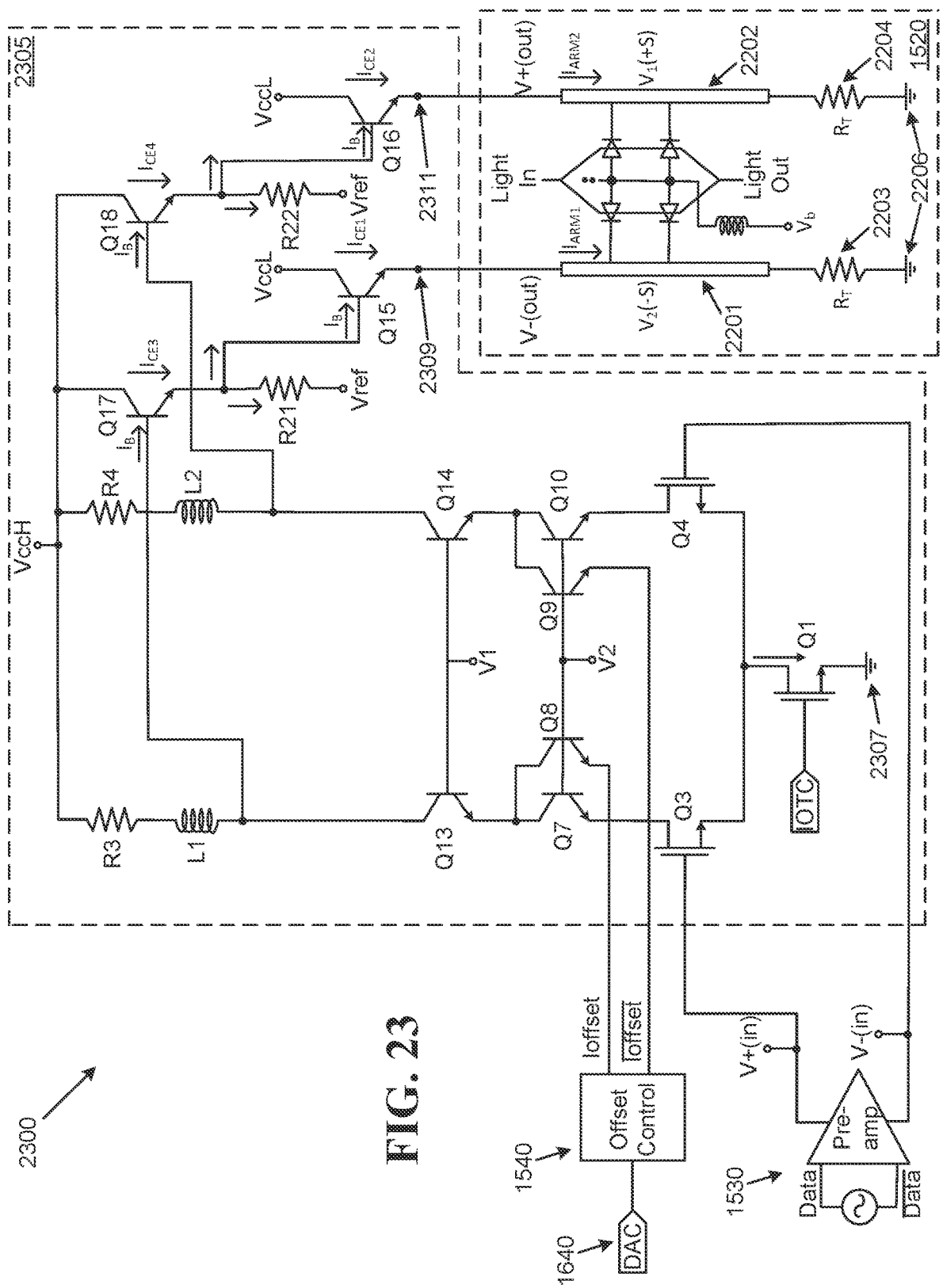
FIG. 23 is a schematic diagram illustrating yet another embodiment of an optical modulator device that is driven by an asymmetrical DC voltage provided by a linear modulator driver having an emitter follower driver that includes a customized dual Darlington configuration.

FIG. 23 is a schematic diagram illustrating another embodiment of a modulator device 2300 that includes an optical modulator 1520 driven by an asymmetrical DC voltage provided by a linear modulator driver 2305. The linear modulator driver 2305 includes an emitter follower driver stage having a customized dual Darlington configuration. The customized dual Darlington configuration includes a first customized Darlington configuration formed of the transistor Q15 and the transistor Q17, and a second customized Darlington configuration formed of the transistor Q16 and the transistor Q18. The first customized Darlington configuration includes some components such as a resistor R21 that is coupled to a voltage Vref. The first customized Darlington configuration also incorporates circuit connections such as, for example, a collector of the transistor Q17 coupled to a first voltage (VccH) and a collector of the transistor Q17 coupled to a different voltage (VccL). The second customized Darlington configuration includes some components such as a resistor R22 coupled to the voltage Vref, and also includes circuit connections such as a collector of the transistor Q18 coupled to the voltage VccH and a collector of the transistor Q16 coupled to the voltage VccL.

In another embodiment, the emitter follower driver stage of the linear modulator driver 2305 can be provided in the form of a typical dual Darlington configuration where both the first Darlington configuration (Q15 and Q17) and the second Darlington configuration (Q16 and Q18) include circuit connections such as, for example, both collectors coupled to a single voltage, no resistor R21 coupled to the voltage Vref, no resistor R22 coupled to the voltage Vref.

The modulator device 2300 addresses issues such as the ones described above with respect to the modulator device 1600, by eliminating the linear cascode circuit in the linear modulator driver 2305. The linear modulator driver 2305 is yet another example embodiment in accordance with the disclosure, of the linear modulator driver 1510 shown in FIG. 15.

The customized dual Darlington configuration (or the typical dual Darlington configuration) that is included in the linear modulator driver 2305 offers high current gain, whereby relatively small changes in the control signals provided by the offset control 1540 translate into significant changes in the collector-to-emitter current flow ($I_{CE1}$) in the transistor Q15 and in the collector-to-emitter current flow ($I_{CE2}$) in the transistor Q16. The high control sensitivity allows a finer level of offset control of the operating bias provided to each of the optical waveguide arms of the optical modulator 1520 and for compensating for structural mismatches in various components of the linear modulator driver 2305.

Eliminating the linear cascode circuit results in the current flow ($I_{ARM1}$) through the first optical waveguide arm 2201 of the optical modulator 1520 being equal to the collector-to-emitter current flow ($I_{CE1}$) through the transistor Q15. In this embodiment, the collector-to-emitter current flow ($I_{CE1}$) through the transistor Q15 is equal to a base current flow ($I_B$) into the transistor Q15 multiplied by the current gain of the transistor Q15. The base current flow ($I_B$) into the transistor Q15 is a portion of the collector-to-emitter current flow ($I_{CE3}$) through the transistor Q17. The collector-to-emitter current flow ($I_{CE3}$) through the transistor Q17 is equal to a base current flow ($I_B$) into the transistor Q17 multiplied by the current gain of the transistor Q17. The amplitude of the collector-to-emitter current flow ($I_{CE3}$) through the transistor Q17 may be set to a desired value by selecting a suitable resistance value of the resistor R21 and an amplitude/polarity of the voltage Vref coupled into the resistor R21.

The current flow ($I_{ARM2}$) through the second optical waveguide arm 2202 of the optical modulator 1520 is equal to the collector-to-emitter current flow ($I_{CE2}$) through the transistor Q16. In this embodiment, the collector-to-emitter current flow ($I_{CE2}$) through the transistor Q16 is equal to a base current flow ($I_B$) into the transistor Q16 multiplied by the current gain of the transistor Q16. The base current flow ($I_B$) into the transistor Q16 is a portion of the collector-to-emitter current flow ($I_{CE4}$) through the transistor Q18. The collector-to-emitter current flow ($I_{CE4}$) through the transistor Q18 is equal to a base current flow ($I_B$) into the transistor Q18 multiplied by the current gain of the transistor Q18. The amplitude of the collector-to-emitter current flow ($I_{CE4}$) through the transistor Q18 may be set to a desired value by selecting a suitable resistance value of the resistor R22 and an amplitude/polarity of the voltage Vref coupled into the resistor R22.

Furthermore, as a result of eliminating the linear cascode circuit, a load imposed upon the linear modulator driver 2305, specifically upon an emitter of the transistor Q15, consists of an impedance of the first optical waveguide arm 2201 of the optical modulator 1520 coupled in series with the terminating resistor 2203. A capacitive component of the impedance presented by the linear cascode circuit to the linear series-stacked differential emitter follower (in the form of the linear cascode circuit shown in FIG. 16) has been eliminated, thereby increasing the operational bandwidth of the optical modulator 1520.

Another load imposed upon the linear modulator driver 2305, specifically upon an emitter of the transistor Q16, consists of an impedance of the second optical waveguide arm 2202 of the optical modulator 1520 coupled in series with a terminating resistor 2204. Here again, a capacitive component of the impedance presented by the linear cascode circuit to the linear series-stacked differential emitter follower (in the form of the linear cascode circuit shown in FIG. 16) has been eliminated, thereby increasing the operational bandwidth of the optical modulator 1520.

Both the terminating resistor 2203 and the terminating resistor 2204 are coupled to a ground node 2206 in this example implementation. In another implementation, the terminating resistor 2203 may be coupled to a voltage supply such as, for example, a negative voltage supply. The terminating resistor 2204 may be coupled to another voltage supply, which can be, for example, the negative supply voltage provided to the terminating resistor 2203.

An offset between the current flow through the first optical waveguide arm 2201 of the optical modulator 1520 and the current flow through the second optical waveguide arm 2202 of the optical modulator 1520 can be set to a suitable value by adjusting the two offset signals provided by the offset control 1540. More particularly, the linear modulator driver 2305 includes two transistors Q8 and Q9, which are driven by the two offset signals. In this embodiment the two offset signals are provided in the form of a first current offset $I_{offset}$ and a second current offset $\overline{I_{offset}}$ that are supplied by the offset control 1540. The two current offsets can be controlled via the DAC 1640 as described above.

Driving the two transistors Q8 and Q9 by the first current $I_{offset}$ and the second current $\overline{I_{offset}}$, which can be set to have a desired difference in currents, results in dissimilar voltages being present at the collector of each of the transistor Q13 and the transistor Q14, which in turn results in dissimilar voltages being present at the base of each of the transistor Q17 and the transistor Q18. As a result, the collector-to-emitter current flow ($I_{CE3}$) through the transistor Q17 and the collector-to-emitter current flow ($I_{CE4}$) through the transistor Q18 have an offset with respect to each other. This, in turn, results in a DC difference between the second output voltage $V_O^-$ and the first output voltage $V_O^+$ and a dissimilar reverse bias voltage for the two pn junctions forming the optical modulator 1520, which in this example is a SPP MZ modulator.

This configuration allows using a single bias voltage $V_b$ to polarize the pn junctions so that they operate in the depletion mode (reverse bias operation), and also operate with different reverse bias voltages Vbias,pn1 and Vbias,pn2, as described above.

In an example of operation of the modulator device 2300, an amount of current offset between Q13 and Q14 could be limited to about ±10% of the driver current (i.e., about ±5 mA). The values of the resistors R3 and R4 can be tailored in accordance with the supply voltage VccH. In various applications, the supply voltage VccH can be set lower than the 6V supply voltage provided to the linear modulator driver 1610 illustrated in FIG. 16, thereby obtaining various advantages such as those described above. In an example implementation, when the supply voltage is at 6V, the voltage V1 applied to the base of the transistors Q13 and Q14 can be about 3.7V and the voltage V2 applied to the base of the transistors Q8 and Q9 can be about 2.4V. When the supply voltage VccH is reduced from 6V, the voltages V1 and V2 can be correspondingly reduced.

The configuration and operations of other components of the modulator device 2300 can be similar to those described above with respect to components of the modulator device 1610 shown in FIG. 16. In this embodiment, the offset control circuit 1540 is configured in the manner described above, to set the transistor Q15 in a first operating state for providing a first operating bias to the first optical waveguide arm 2201 of the optical modulator 1520 and the transistor Q16 in a second operating state for providing a second operating bias to the second optical waveguide arm 2202 of the optical modulator 1520. The first optical waveguide arm 2201 of the optical modulator 1520 exhibits a first modulation characteristic and the second optical waveguide arm 2202 of the optical modulator 1520 exhibits a second modulation characteristic that can be different than the first modulation characteristic.

The optical modulator control 1530, like the control shown in the previous solutions, includes a source AC signal that provides an alternating DATA signal that is amplified to provide inputs to the linear modulator driver 2305. In this case, the amplifier is referred to as a pre-amp to reflect that the first target voltage $V_{in}^+$ and the second target voltage $V_{in}^-$ are subsequently modified by the linear modulator driver 2305. Specifically, the optical modulator control 1530 applies the first target voltage $V_{in}^+$ to a gate of the transistor Q3 and the second target voltage $V_{in}^-$ to a gate of the transistor Q4. The emitters of the transistors Q3 and Q4 are coupled to a transistor Q1 whose source is coupled to the ground node 2307.

As indicated above, the embodiment shown in FIG. 23 excludes the linear cascode circuit (transistors Q11, Q12, Q5, Q6, and Q2) of the embodiment shown in FIG. 16. Consequently, the IOTC control that is applied to the gate of the transistor Q1 is not used to control the transistor Q2 of the linear cascode circuit. Getting rid of the control operation upon the transistor Q2 of the eliminated linear cascode circuit provides some advantages such as, for example, eliminating current draw by the transistor Q2 (and associated linear cascode circuit) and eliminating the need to address a structural mismatch, if present, between the transistor Q1 and the transistor Q2.

The linear modulator driver 2305 may be operated to address various issues such as, for example, structural mismatches that may be introduced into various components of the modulator device 2300 during manufacture and/or structural mismatches that may be present in the optical modulator 1520. Some details pertaining to such operations have been provided above with reference to the linear modulator driver 1610 and the liner modulator driver 2205.

Furthermore, in some applications, the modulator device 2300 can include an optional feedback mechanism or circuit (such as the circuit 1550 described above). The circuit 1550 (shown in FIG. 16) can be coupled to various nodes of the optical modulator device 2305. In an example implementation, the circuit 1550 (or any other feedback tap) can be coupled to the emitters of the transistor Q15 and the transistor Q16 (node 2309 and node 2311 respectively) in a manner similar to that illustrated in FIG. 16 for the modulator device 1600. The circuit 1550 can also be coupled to other nodes if it is desired to avoid capacitive/parasitic loading of the emitters of the transistors Q15 and Q16.

The apparatuses, circuits, and methods described herein are broadly applicable to lumped and distributed driver and optical modulator element applications, applying equally to SPP applications utilizing a pnnp configuration, for example. These apparatuses, circuits, and methods can be applied to reverse biased pn junctions, as well as to pn junctions in forward conduction. The apparatuses, circuits, and methods are applicable to optical modulators utilizing multiple sections, each section being driven individually by its own driver. Each section could be driven with the same signal shifted in time or using different signals, as in an optical DAC (with each section driven by the signal corresponding to one bit of the modulation format), for example.

The proposed apparatuses, circuits, and methods improve the robustness of an optical modulator to mask misalignment during its manufacture by providing independent bias to each pn junction, while at the same time enabling maximum power/electrical swing being delivered to the optical modulator. Advantageously, the apparatuses, circuits, and methods consume less power and may be more compact than alternative schemes.

An alternative, conventional linear drivers for high-order n-QAM/OFDM coherent and high-order PAM-n/DMT intensity modulation systems and carrier-less amplitude phase modulation (CAP-n) systems intentionally attempt to have the same common mode voltage or collector current traveling in both output complements transistors Q1 and Q2 in order to minimize even order harmonic distortion. As the result of this architecture, a common bias $V_1$ and $V_2$ on the two MZ modulator arms +S and −S is provided, where $V_1 = V_2 = V_{dd} - I_{DC} R_T$. This is applicable to both open collector and back-terminated drivers, for example. The shortcoming of this solution is that it does not address MZ modulator arm mismatch or resistor mismatch, as discussed herein above.

To address this shortcoming, it is possible to independently bias the pn junctions in the two MZ modulator arms by using a driver (either open collector/drain or back-terminated) that is supplied with two different voltages that can be independently adjusted to address the MZ modulator imbalance and termination resistor RT inequalities. However, this configuration is disadvantageous. Although it does solve the MZ modulator imbalance with two separate supplies Vsp and Vsn, it is very complex to implement because it requires two independent voltage regulators, increasing the complexity in highly-integrated and compact solutions.

It is further possible to AC-couple the driver (either open collector/drain or back-terminated) to the MZ modulator. Again, the driver is supplied with two different voltages that can be independently adjusted to solve the MZ modulator imbalance and termination resistor $R_T$ inequalities. Again, this configuration is disadvantageous. While it does solve the MZ modulator imbalance with two separate supplies, the driver current $I_{DC}$ is isolated to inductors, thus eliminating the current requirements on the two independent MZ modulator bias supplies. This is very complex to manufacture because it requires the addition of bias tees and DC blocks to isolate the DC common mode of the driver from the MZ modulator bias, thus increasing the complexity in highly-integrated and compact packaging solutions and moreover increasing RF losses.

The above alternative solutions either do not provide a solution to MZ modulator or termination resistor imbalance, and in configurations where they do provide an imbalance solution, they are complex in terms of packaging and implementation, whereby additional DACs and regulators are required to provide independent bias and bias tees and DC blocks to distinguish the driver output common mode voltage from the MZ modulator bias. This prohibits use in compact highly-integrated packages, such as Coherent Optical Sub-Assemblies (COSAs) and Integrated Coherent Transmitter-Receiver Optical Sub-Assemblies (IC-TRO-SAs).

Another alternative solution is to use the driver topology presented in the paper identified above. In order to use the push-pull amplifier with an external biasing circuit, the interface between the output of the driver and the optical modulator arms requires DC blocks (AC coupling), to isolate the DC common mode of the output from the optical modulator bias. The optical modulator is supplied with two different voltages Vsp and Vsn, so that they can be independently adjusted to solve the modulator imbalance. This configuration is also disadvantageous. Although it solves the modulator imbalance with two separate supplies Vsp and Vsn, this solution incurs higher RF losses due to the introduction of DC blocks and requires two independent voltage regulators or DACs, thus increasing the complexity in highly integrated and compact solutions.

All embodiments of the proposed solution are based on controlling the DC offset of the driver output complements, resulting in modulator pairs that have the same efficiency, thereby sufficiently negating manufacturing error and resultant modulator chirp. In the transmitter section of a COSA, for example, RF imbalance is one important parameter of the modulator, such as one required for QPSK modulation. One cause of RF imbalance is the unequal phase modulation efficiency in the two arms of the optical modulator. The proposed solution minimizes the RF imbalance of modulators and increases the manufacturing yield, improving transmitter performance to meet a chirp parameter <±0.05, for example, while providing a compact solution as optical modems evolve to being highly integrated and compact for inclusion into pluggables and optics-on-board (OBO) solutions. It should be noted that the devices and methods of the proposed solution are not limited to SiP-based technologies, but could also benefit InP-based modulators and the like as they would also have some manufacturing errors, even if to a smaller degree.

As used herein, the terminology "computer" or "computing device" includes any unit, or combination of units, capable of performing any method, or any portion or portions thereof, disclosed herein. The computer or computing device may include a processor.

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. An apparatus comprising:
    an optical modulator configured to produce a target phase modulation between a first optical waveguide arm and a second optical waveguide arm of an optical modulator;
    a linear modulator driver coupled to the optical modulator, the linear modulator driver comprising an emitter follower differential stage that includes a first transistor and a second transistor, wherein an emitter of the first transistor is coupled to the first optical waveguide arm of the optical modulator and an emitter of the second transistor is coupled to the second optical waveguide arm of the optical modulator; and
    an offset control circuit coupled to the linear modulator driver, the offset control circuit configured to set the first transistor in a first operating state for providing a first operating bias to the first optical waveguide arm of the optical modulator and the second transistor in a second operating state for providing a second operating bias to the second optical waveguide arm of the optical modulator, whereby the first optical waveguide arm exhibits a first modulation characteristic and the second optical waveguide arm exhibits a second modulation characteristic that is different than the first modulation characteristic.

2. The apparatus of claim 1, wherein the offset control circuit is configured to place the first transistor in the first operating state based on an amplitude of a first collector-to-emitter current flow through the first transistor, and further wherein the offset control circuit is further configured to place the second transistor in the second operating state based on an amplitude of a second collector-to-emitter current flow through the second transistor.

3. The apparatus of claim 2, wherein the first collector-to-emitter current flow through the first transistor is substantially equal to a first current that flows through the first optical waveguide arm and produces the first operating bias, and further wherein the second collector-to-emitter current flow through the second transistor is substantially equal to a second current that flows through the second optical waveguide arm and produces the second operating bias.

4. The apparatus of claim 3, further comprising a first terminating resistor coupled between the first optical waveguide arm and a ground node and a second terminating resistor coupled between the second optical waveguide arm and the ground node, whereby a first load imposed upon the emitter of the first transistor consists of the first optical waveguide arm coupled in series with the first terminating resistor, and whereby a second load imposed upon the emitter of the second transistor consists of the second optical waveguide arm coupled in series with the second terminating resistor.

5. The apparatus of claim 1, wherein the emitter follower differential stage further includes a third transistor and a fourth transistor, the third transistor arranged in a first cascade arrangement with the first transistor and the fourth transistor arranged in a second cascade arrangement with the second transistor.

6. The apparatus of claim 1, wherein the emitter follower differential stage further includes a third transistor and a fourth transistor, the third transistor coupled to the first transistor in a first customized Darlington configuration, the fourth transistor coupled to the second transistor in a second customized Darlington configuration.

7. The apparatus of claim 6, wherein the first customized Darlington configuration comprises a collector of the first transistor coupled to a first supply voltage and a collector of the third transistor coupled to a second supply voltage, and wherein the second customized Darlington configuration comprises a collector of the second transistor coupled to the first supply voltage and a collector of the fourth transistor coupled to the second supply voltage.

8. The apparatus of claim 7, wherein an emitter of the third transistor is coupled via a first resistor to a third supply voltage and an emitter of the fourth transistor is coupled via a second resistor to the third supply voltage.

9. The apparatus of claim 6, wherein a collector of the first transistor is coupled to a first supply voltage, a collector of the second transistor is coupled to the first supply voltage, a collector of the third transistor is coupled to a second supply voltage, and a collector of the fourth transistor is coupled to the second supply voltage, wherein an amplitude of the first supply voltage is lower than an amplitude of the second supply voltage.

10. The apparatus of claim 6, wherein the second modulation characteristic is settable to be different than the first modulation characteristic to compensate for at least one of a first structural mismatch between the first optical waveguide arm and the second optical waveguide arm of the optical modulator during manufacture and/or to compensate for a second structural mismatch between at least two of the first transistor, the second transistor, the third transistor, and the fourth transistor, during manufacture.

11. The apparatus of claim 6, wherein the offset control circuit is configured to place the second transistor in the first operating state based on an amplitude of a first collector-to-emitter current flow in the second transistor, and further wherein the offset control circuit is further configured to place the fourth transistor in the second operating state based on an amplitude of a second collector-to-emitter current flow in the fourth transistor.

12. A method, comprising:
    receiving, by a linear modulator driver, from an offset control circuit, a first offset control signal and a second offset control signal, the linear modulator driver comprising an emitter follower differential stage that includes a first transistor and a second transistor;
    producing at an emitter of the first transistor, based on the first offset control signal, a first operating bias for biasing a first optical waveguide arm of an optical modulator, whereby the first optical waveguide arm exhibits a first modulation characteristic; and producing at an emitter of the second transistor, based on the second offset control signal, a second operating bias for biasing a second optical waveguide arm of the optical modulator, whereby the second optical waveguide arm exhibits a second modulation characteristic that is different than the first modulation characteristic.

13. The method of claim 12, further comprising:

calibrating an offset between the first offset control signal and the second offset control signal to minimize a difference between a target modulation and an actual modulation of the optical modulator.

14. The method of claim 13, wherein the first offset control signal is a first offset current and the second offset control signal is a second offset current, and the method further comprises:

receiving, by the linear modulator driver, a first target voltage and a second target voltage;

modifying the first target voltage using the first offset current;

modifying the second target voltage using the second offset current; and coupling the modified first target voltage into a base of the first transistor and coupling the modified second target voltage into a base of the second transistor, whereby the optical modulator provides the target modulation.

15. The method of claim 14, wherein the first operating bias that is coupled into the first optical waveguide arm of the optical modulator from the emitter of the first transistor tracks the modified first target voltage applied to the base of the first transistor and wherein the second operating bias that is coupled into the second optical waveguide arm of the optical modulator from the emitter of the second transistor tracks the modified second target voltage applied to the base of the second transistor.

16. The method of claim 15, further comprising:

producing a first feedback signal based on monitoring the first operating bias applied to the first optical waveguide arm of the optical modulator;

producing a second feedback signal based on monitoring the second operating bias applied to the second optical waveguide arm of the optical modulator;

coupling the first feedback signal and the second feedback signal into the offset control circuit;

adjusting, by the offset control circuit, the first offset current based on the first feedback signal; and adjusting, by the offset control circuit, the second offset current based on the second feedback signal.

17. An apparatus, comprising:

an optical modulator control circuit configured to generate a first target voltage and a second target voltage;

an offset control circuit configured to generate a first offset signal and a second offset signal; and a linear modulator driver configured to receive the first target voltage and the second target voltage;

receive the first offset signal and the second offset signal;

generate, using the first offset signal and the first target voltage, a first output voltage for biasing a first optical waveguide arm of an optical modulator; and generate, using the second offset signal and the second target voltage, a second output voltage for biasing a second optical waveguide arm of the optical modulator, wherein at least one of the first output voltage is different from the first target voltage or the second output voltage is different from the second target voltage, and wherein the first output voltage and the second output voltage produce a desired phase modulation between the first optical waveguide arm and the second optical waveguide arm of the optical modulator.

18. The apparatus of claim 17, wherein the linear modulator driver comprises an emitter follower differential stage that includes a first transistor coupled to a second transistor in a first customized Darlington configuration and a third transistor coupled to a fourth transistor in a second customized Darlington configuration, and wherein an emitter of the second transistor is coupled to the first optical waveguide arm of the optical modulator and an emitter of the fourth transistor is coupled to the second optical waveguide arm of the optical modulator.

\* \* \* \* \*